United States Patent
Fujii

(10) Patent No.: US 8,614,765 B2
(45) Date of Patent: Dec. 24, 2013

(54) IMAGE CAPTURING APPARATUS, IMAGE CAPTURING DEVICE, IMAGE CAPTURING METHOD, AND PROGRAM FOR PHASE DIFFERENCE DETECTION

(75) Inventor: Shinichi Fujii, Kanagawa (JP)

(73) Assignee: Sony Corporation, Tokyo (JP)

( * ) Notice: Subject to any disclaimer, the term of this patent is extended or adjusted under 35 U.S.C. 154(b) by 315 days.

(21) Appl. No.: 13/155,684

(22) Filed: Jun. 8, 2011

(65) Prior Publication Data
US 2012/0033115 A1 Feb. 9, 2012

(30) Foreign Application Priority Data
Aug. 3, 2010 (JP) ................ 2010-174117

(51) Int. Cl.
H04N 5/225 (2006.01)
H04N 5/232 (2006.01)
G03B 13/00 (2006.01)

(52) U.S. Cl.
USPC .................................. 348/361; 348/349

(58) Field of Classification Search
None
See application file for complete search history.

(56) References Cited

U.S. PATENT DOCUMENTS

| 7,844,173 B2 | 11/2010 | Fujii |
| 8,174,607 B2 * | 5/2012 | Goto .................. 348/345 |
| 2008/0118238 A1 | 5/2008 | Sogawa |
| 2010/0091161 A1 * | 4/2010 | Suzuki ................ 348/302 |

FOREIGN PATENT DOCUMENTS

JP 2000-305010 11/2000

* cited by examiner

Primary Examiner — Albert Cutler
(74) Attorney, Agent, or Firm — Sony Corporation

(57) ABSTRACT

Provided is an image-capturing apparatus including: an image-capturing device where pixels covered with first filters blocking light other than light in a first wavelength range among wavelength ranges obtained by two-dividing a specific wavelength range and second filters blocking light other than light in a second wavelength range are disposed based on a predetermined rule; a light-blocking filter being detachably disposed in an optical path of subject light toward the image-capturing device and blocking the light in the first wavelength range; a focus-alignment determination unit performing focus-alignment determination through phase-difference detection based on a signal generated by the image-capturing device when the light-blocking filter is inserted into the optical path; an image-generation unit generating an image based on a signal generated by the image-capturing device; and a controller controlling insertion/detachment of the light-blocking filter with respect to the optical path based on necessity of the focus-alignment determination.

11 Claims, 22 Drawing Sheets

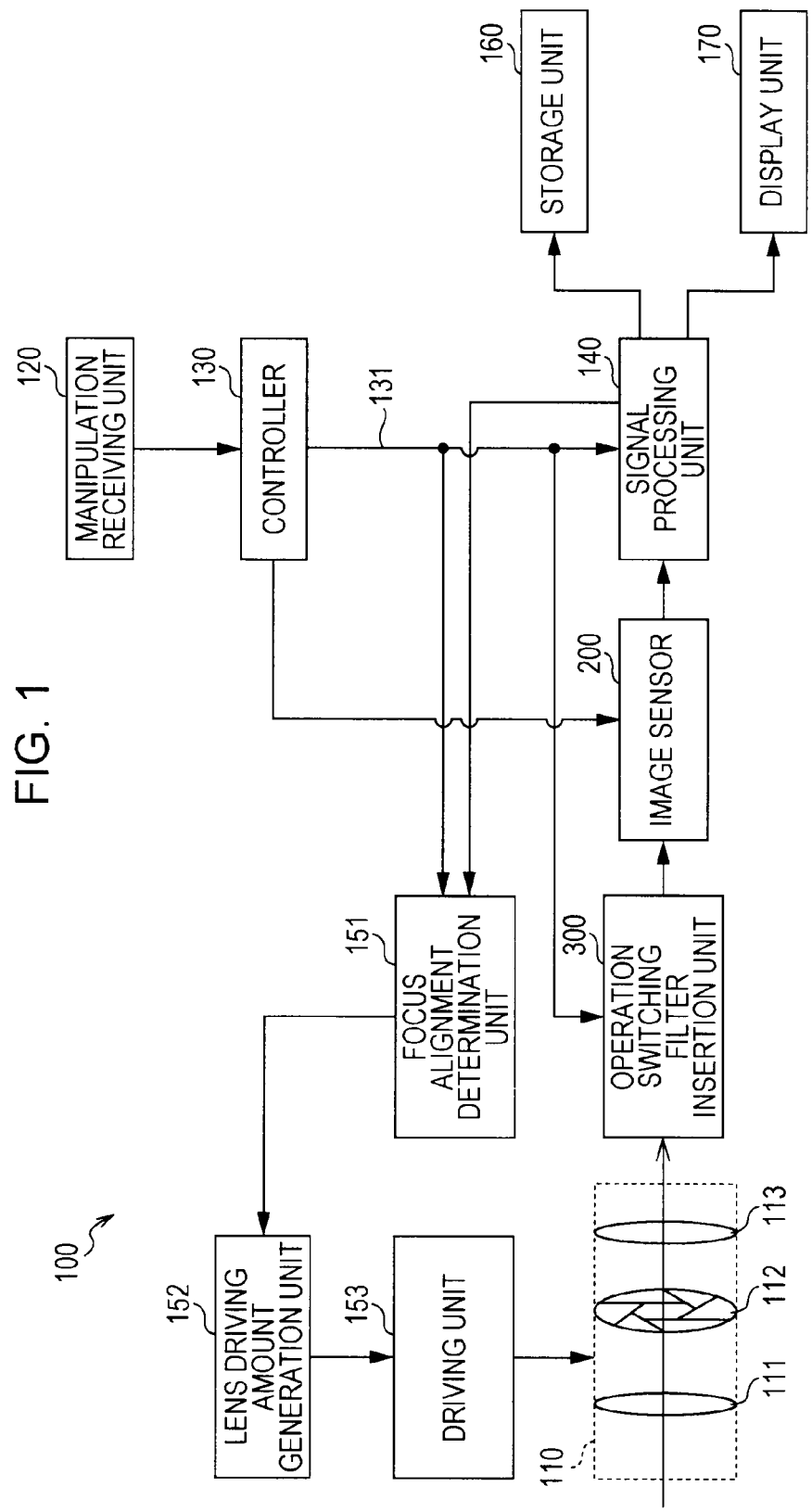

FIG. 16A
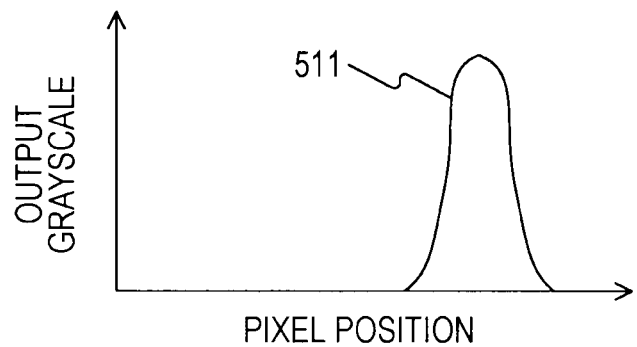
FIG. 16B
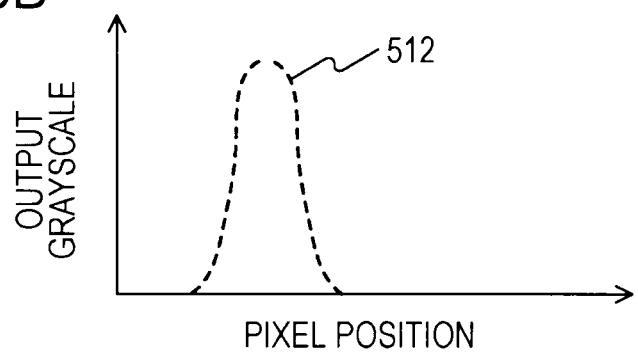
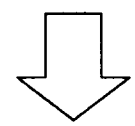
FIG. 16C
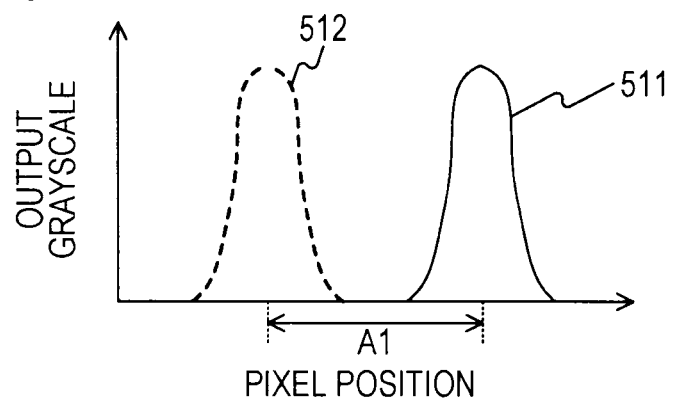

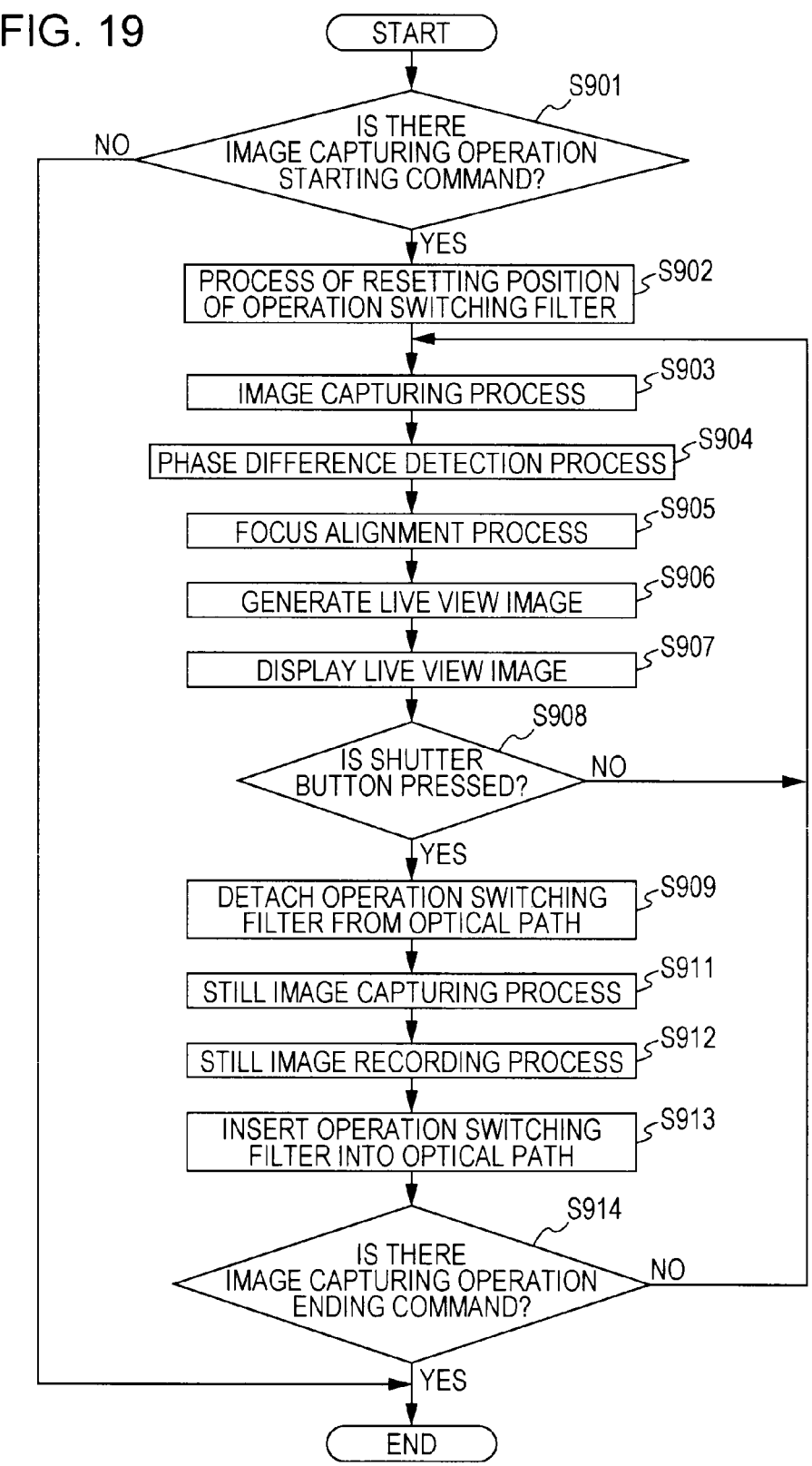

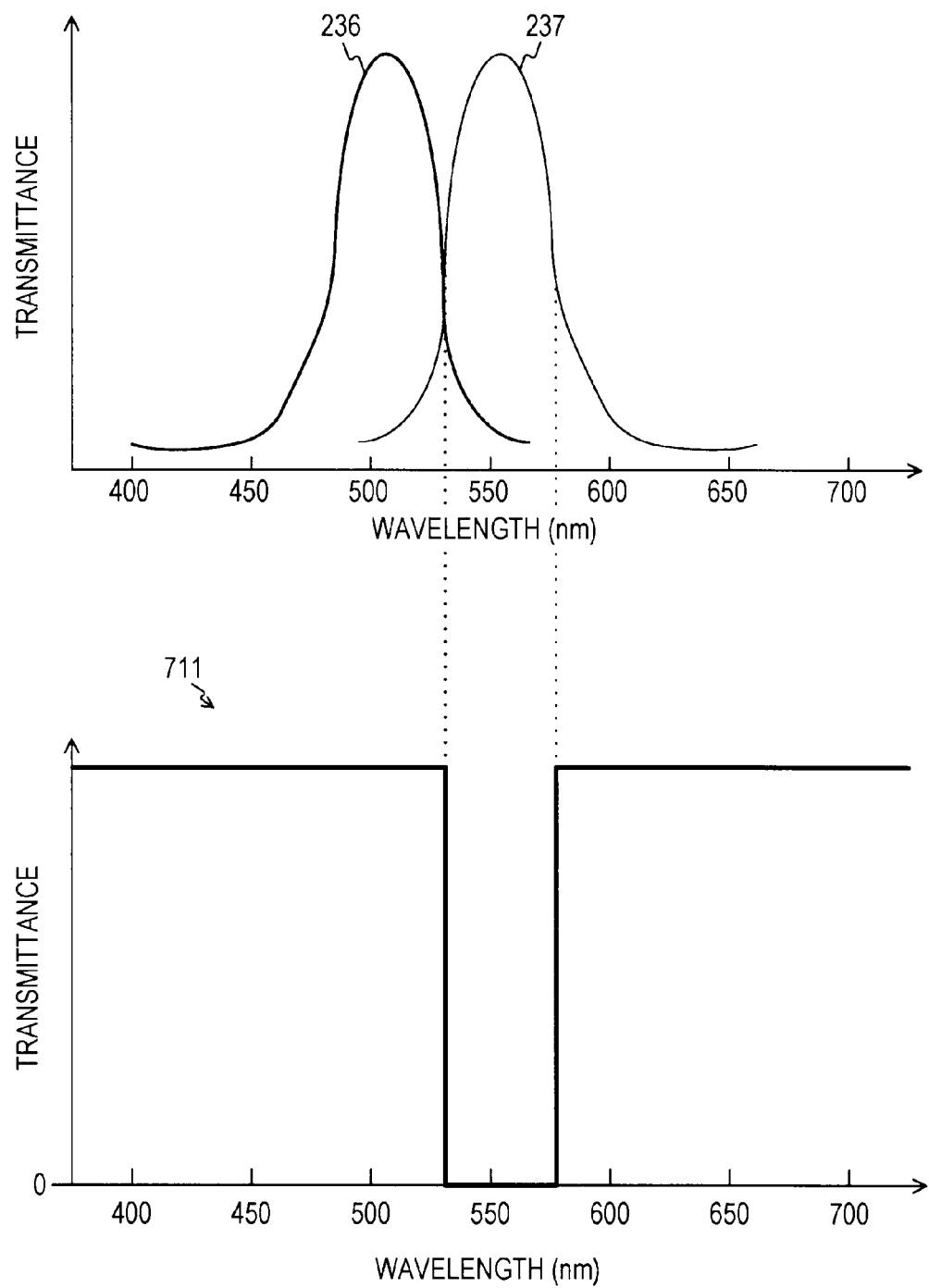

IMAGE CAPTURING APPARATUS, IMAGE CAPTURING DEVICE, IMAGE CAPTURING METHOD, AND PROGRAM FOR PHASE DIFFERENCE DETECTION

BACKGROUND

The present disclosure relates to an image capturing apparatus, and more particularly, to an image capturing apparatus, an image capturing device, and an image capturing method which perform phase difference detection and a program which allows a computer to execute the method.

Recently image capturing apparatuses such as digital still cameras generating an image by image-capturing a subject such as a person and recording the generated captured image have become widespread. In addition, as the image capturing apparatuses, for convenience of a user's image-capturing manipulation, image capturing apparatuses having an auto focus (AF) function for automatically performing focus adjustment at the image capturing time have become widespread.

As the image capturing apparatus, for example, an image capturing apparatus which generates a pair of images by pupil-dividing light transmitting through an image capturing lens and determining a position of the image capturing lens by measuring an interval between the generated images (detecting a phase difference) is disclosed (refer to, for example, Japanese Unexamined Patent Application Publication No. 2000-305010 (FIG. 1)). The image capturing apparatus generates a pair of images by using an image sensor including pixels for focus detection, where a pair of light receiving devices is provided to each pixel, and calculates an amount of focus shift by measuring an interval between the generated images. Next, the image capturing apparatus calculates a movement amount of the image capturing lens based on the calculated amount of the focus shift and aligns focus by adjusting the position of the image capturing lens based on the calculated movement amount (focus adjustment).

SUMMARY

In the aforementioned related art, since the phase difference detection (focus detection) pixels and the captured image generation pixels are included in one image sensor, it is not necessary that two sensors of a sensor for focus detection and a sensor for a captured image are separately provided.

However, in the aforementioned related art, since the phase difference detection pixels and the image capturing pixels are disposed to be adjacent to each other in the image sensor, the Bayer array may not be configured in an area where the phase difference detection pixels are disposed. In addition, since the phase difference detection pixels may not generate signals used for the image generation, the positions of the phase difference detection pixels may be treated as defective pixels. Therefore, in the image corresponding to the phase difference detection pixels and the image corresponding to the image capturing pixels adjacent to the phase difference detection pixels, there is a possibility that a quality of the image deteriorates.

It is desirable to improve a quality of an image in the case where the image is generated by using an image sensor which is used for phase difference detection and image generation.

According to a first embodiment of the present disclosure, there are provided an image capturing apparatus including: an image capturing device where pixels covered with first filters which block light other than light in the one first wavelength range among wavelength ranges obtained by two-dividing a specific wavelength range and second filters which block light other than light in the other second wavelength range among the two-divided wavelength ranges are disposed based on a predetermined rule; a light blocking filter which is detachably disposed in an optical path of subject light toward the image capturing device and which blocks the light in the first wavelength range; a focus alignment determination unit which performs focus alignment determination through phase difference detection based on a signal generated by the image capturing device when the light blocking filter is inserted into the optical path; an image generation unit which generates an image based on a signal generated by the image capturing device; and a controller which performs control of insertion and detachment of the light blocking filter with respect to the optical path based on necessity or non-necessity of the focus alignment determination, an image capturing method thereof, and a program allowing a computer to execute the method. Accordingly, by using the image capturing device where the pixels covered with the first filters and the second filters are disposed based on a predetermined rule, a function of performing the image generation and the focus alignment determination through the phase difference detection may be obtained.

In addition, in the first embodiment of the present disclosure, the image capturing device may be configured so that the first pixels covered with the first filters and the second filters, which are disposed to be aligned in a specific direction, and the second pixels covered with the arrangement-switched first filters and second filters, which are obtained by switching the arrangement of the first filters and the second filters covering the first pixels, are disposed as the pixels, and the focus alignment determination unit may perform the focus alignment determination through the phase difference detection based on signals generated by the first pixels and signals generated by the second pixels. Accordingly, a function of detecting the phase difference based on a first signal generated by the first pixel and a second signal generated by the second pixel and performing the focus alignment determination may be obtained. In addition, in this case, the first pixels and the second pixels may be configured so that the first filters and the second filters are disposed to be aligned by using a straight line passing through centers of light receiving devices included in the pixels as a division line. Accordingly, a function of disposing the first filters and the second filters to be aligned by using the straight line passing through the centers of the light receiving devices as a division line may be obtained.

In addition, in the first embodiment of the present disclosure, the image capturing apparatus may further include: a manipulation receiving unit which receives a recording command manipulation of instructing recording of a still image; and a recording controller which allows the image generated by the image generation unit to be recorded in a recording medium, wherein, when the recording command manipulation is received, the controller allows the light blocking filter inserted into the optical path to be detached from the optical path, and wherein, when the light blocking filter is detached from the optical path, the image generation unit generates the image based on the signal generated by the image capturing device. Accordingly, in the case where the recording command manipulation of instructing the recording of the still image is received, a function of recording the image, which is generated based on the signal generated by the image capturing device when the light blocking filter is detached from the optical path, in the recording medium may be obtained.

In addition, in the first embodiment of the present disclosure, the image capturing apparatus may further include a display controller which allows the image generated by the image generation unit to be displayed on a display unit, wherein, when the light blocking filter is inserted into the optical path, the image generation unit generates the image based on the signal generated by the image capturing device. Accordingly, a function of generating the image based on the signal, which is generated by the image capturing device when the light blocking filter is inserted into the optical path, and displaying the generated image on the display unit may be obtained.

In addition, in the first embodiment of the present disclosure, the image capturing apparatus may further include a recording controller which allows a moving picture including the image generated by the image generation unit to be recorded in a recording medium, wherein, when the light blocking filter is inserted into the optical path, the image generation unit generates the image based on the signal generated by the image capturing device. Accordingly, a function of generating the image based on the signal, which is generated by the image capturing device when the light blocking filter is inserted into the optical path, and recording a moving picture including the generated image in the recording medium may be obtained.

In addition, in the first embodiment of the present disclosure, the image capturing device may be configured so that pixels where one of a plurality of filters having different spectral sensitivities is disposed to each of the pixels and pixels covered with the first filters and the second filters, where a wavelength range of one filter of a plurality of the filters is the specific wavelength range, are disposed based on a predetermined rule. Accordingly, a function of disposing the pixels, where one of a plurality of the filters having different spectral sensitivities is disposed to each of the pixels, and the pixels covered with the first filters and the second filters based on a predetermined rule may be obtained. In addition, in this case, the image capturing device may be configured so that red pixels covered with red filters which block light other than light in a wavelength range representing a red color, blue pixels covered with blue filters which block light other than light in a wavelength range representing a blue color, and pixels covered with the first filters and the second filters, where a wavelength range representing a green color is the specific wavelength range, are disposed; and the image generation unit may generate the image based on signals supplied by the red pixels, signals supplied by the blue pixels, and signals supplied by the pixels covered with the first filters and the second filters. Accordingly, a function of generating the image based on the signals supplied by the red pixels, the blue pixels, and the pixels covered with the first filters and the second filters may be obtained. In addition, in this case, the image capturing device may be configured so that the red pixels, the blue pixels, and the pixels covered with the first filters and the second filters are disposed in a Bayer array. Accordingly, a function of disposing the red pixels, the blue pixels, and the pixels covered with the first filters and the second filters in the Bayer array in the image capturing device may be obtained.

According to a second embodiment of the present disclosure, there is provided an image capturing device where pixels covered with first filters which block light other than light in the one first wavelength range among wavelength ranges obtained by two-dividing a specific wavelength range and second filters which block light other than light in the other second wavelength range among the two-divided wavelength ranges are disposed based on a predetermined rule, wherein one of a signal generated based on light transmitting through the first filter and light transmitting through the second filter and a signal generated based on the light transmitting through the second filter is supplied according to control of a light blocking filter which blocks light in the first wavelength range. Accordingly, a function of supplying one of the signal generated based on the light transmitting through the first filters and the light transmitting through the second filters and the signal generated based on the light transmitting through the second filter by using the image capturing device, where the pixels covered with the first filters and the second filters are disposed based on a predetermined rule, according to control of the light blocking filter which blocks the light in the first wavelength range may be obtained.

According to the embodiments of the present disclosure, in the case where an image is generated by using an image sensor which is used for phase difference detection and image generation, it is possible to improve the quality of the generated image.

BRIEF DESCRIPTION OF THE DRAWINGS

FIG. 1 is a block diagram illustrating an example of functions and configurations of an image capturing apparatus according to a first embodiment of the present disclosure.

FIGS. 16A to 16C are diagrams illustrating an example of the phase difference detection in the case where a focus is aligned with a position behind the subject according to the first embodiment of the present disclosure.

FIG. 19 is a flowchart illustrating an example of an image capturing process procedure in the case a still image is captured by the image capturing apparatus according to the first embodiment of the present disclosure.

FIG. 21 is a graph illustrating an example of spectral characteristics of an operation switching filter (operation switching filter) which blocks G1 light according to a third embodiment of the present disclosure, and FIG. 21 corresponds to FIG. 9.

DETAILED DESCRIPTION OF EMBODIMENTS

Figure 2A:
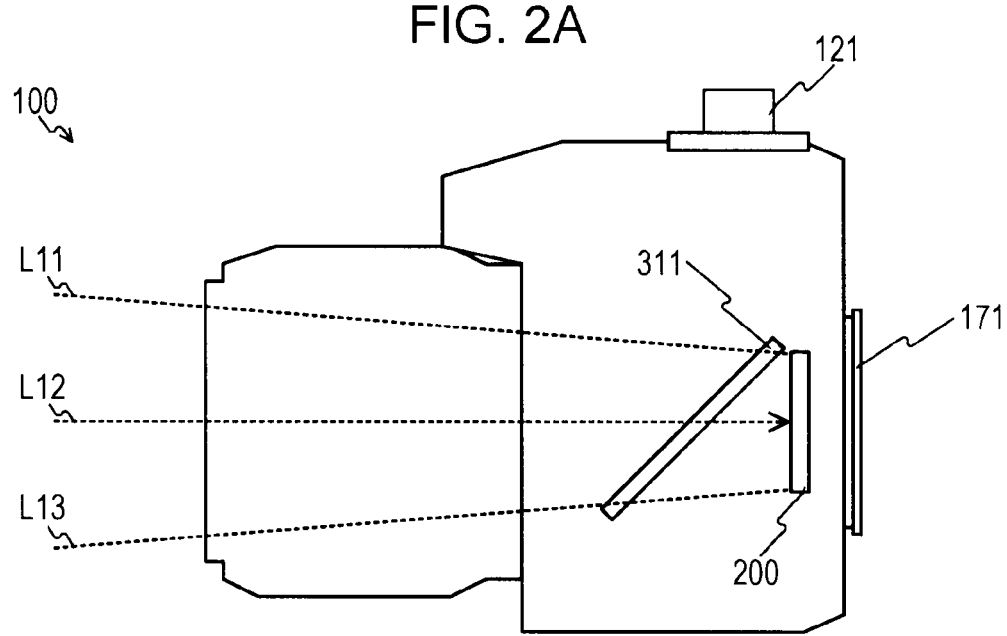
FIGS. 2A and 2B are schematic cross-sectional diagrams illustrating positions of an operation switching filter with respect to subject light incident on the image capturing apparatus according to the first embodiment of the present disclosure.

Hereinafter, embodiments of the present disclosure will be described.

The description will be made in the following order.

1. First Embodiment (Image Capturing Control: Example of Front Surface Type Image Sensor)

2. Second Embodiment (Image Capturing Control: Example of Rear Surface Type Image Sensor)

3. Third Embodiment (Image Capturing Control: Example where Wavelength Range of G1 Filter is Used as Wavelength Range which is Blocked by Operation Switching Filter)

4. Fourth Embodiment (Image Capturing Control: Example where Filter of R Pixel is Used as Filter for Detecting Phase Difference)

1. First Embodiment

[Example of Functions and Configurations of Image Capturing Apparatus]

FIG. 1 is a block diagram illustrating an example of functions and configurations of an image capturing apparatus 100 according to a first embodiment of the present disclosure.

The image capturing apparatus 100 includes a lens unit 110, a manipulation receiving unit 120, a controller 130, an operation switching filter insertion unit 300, an image sensor 200, and a signal processing unit 140. In addition, the image capturing apparatus 100 includes a focus alignment determination unit 151, a lens driving amount generation unit 152, a driving unit 153, a storage unit 160, and a display unit 170.

The lens unit 110 is configured to collect light (subject light) from a subject into the image sensor 200. The lens unit 110 includes a zoom lens 111, a diaphragm 112, and a focus lens 113.

The zoom lens 111 is configured to be moved in an optical axis direction by driving of the driving unit 153 to change a focal length, so that a magnification ratio of the subject included in a captured image is adjusted.

The diaphragm 112 is a covering material for adjusting a light amount of the subject light incident on the image capturing apparatus 100 by changing a degree of aperture by the driving of the driving unit 153.

The focus lens 113 is configured to be moved in the optical axis direction by the driving of the driving unit 153 to adjust a focus through the movement in the optical axis direction.

The manipulation receiving unit 120 is configured to receive manipulation from a user. For example, in the case where a shutter button 121 (illustrated in FIGS. 2A and 2B) is pressed, the manipulation receiving unit 120 supplies a signal regarding the pressing as a manipulation signal to the controller 130.

The controller 130 is configured to control operations of components of the image capturing apparatus 100. For example, the controller 130 controls an image capturing operation of the image sensor 200. In addition, in the case where a photographing mode of the image capturing apparatus 100 is set to perform focus alignment determination according to a phase difference detection method, the controller 130 generates a signal (phase difference detection operation signal) indicating a state where an operation (phase difference detection operation) of performing the focus alignment determination is performed. Herein, the phase difference detection method is a focus detection method of pupil-dividing light passing through the image capturing lens to generate a pair of images and measuring (detecting phase difference) an interval (shift amount between the images) between the generated images to detect a degree of focus alignment. Next, the controller 130 supplies the phase difference detection operation signal through a signal line 131 to the focus alignment determination unit 151, the operation switching filter insertion unit 300, and the signal processing unit 140.

In addition, in the case where the manipulation signal is supplied by fully pressing the shutter button, the controller 130 generates a signal (still image capturing operation signal) indicating a state where an operation (still image capturing operation) of recording a still image in the storage unit 160 is performed. Next, the controller 130 supplies the still image capturing operation signal through the signal line 131 to the focus alignment determination unit 151, the operation switching filter insertion unit 300, and the signal processing unit 140. In addition, in the case where the operation of recording the still image is ended, the controller 130 supplies the phase difference detection operation signal to the components connected through the signal line 131.

The operation switching filter insertion unit 300 inserts an operation switching filter (operation switching filter 311 illustrated in FIGS. 2A and 2B) into an optical path of the subject light incident on the image sensor 200 in the case of performing phase difference detection. Herein, the operation switching filter is an optical filter which does not transmits light in a predetermined wavelength range. In the case where the phase difference detection operation signal is supplied from the controller 130, the operation switching filter insertion unit 300 inserts the operation switching filter into the optical path. In addition, in the case where the still image capturing operation signal is supplied from the controller 130, the operation switching filter insertion unit 300 detaches the operation switching filter from the optical path. In addition, the insertion of the operation switching filter into the optical path will be described with reference to FIGS. 2A and 2B. In addition, characteristics of the operation switching filter will be described with reference to FIGS. 7A and 7B.

The image sensor 200 is an image capturing device which photoelectrically converts the subject light passing through the lens unit 110 into an electrical signal. The image sensor 200 is implemented with, for example, a CMOS (Complementary Metal Oxide Semiconductor) sensor, a CCD (Charge Coupled Device) sensor, or the like. The image sensor 200 supplies the electrical signal generated through photoelectric conversion to the signal processing unit 140. In addition, the image sensor 200 will be described with reference to FIGS. 3 to 8.

The signal processing unit 140 is configured to apply various signal processes on the electrical signal supplied from the image sensor 200. For example, in the case where the phase difference detection operation signal is supplied from the controller 130, the signal processing unit 140 generates data (phase difference detection data) for detecting the phase difference based on output signals of the pixels which generates signals used for the phase difference detection. Next, the signal processing unit 140 supplies the generated phase difference detection data to the focus alignment determination unit 151. In addition, in the case where the phase difference detection operation signal is supplied, the signal processing unit 140 generates data (live view image data) of an image for live view, which displays the subject image received by the image sensor 200 in real time. Next, the signal processing unit 140 supplies the generated live view image data to the display unit 170 to display the live view on the display screen of the display unit 170. In addition, in the case where the still image capturing operation signal is supplied from the controller 130, the signal processing unit 140 generates data (still image data) of the still image. Next, the signal processing unit 140 supplies the generated still image data to the storage unit 160 to store the still image data in the storage unit 160. In addition, the phase difference detection data generated by the signal processing unit 140 will be described with reference to FIGS. 16A to 16C. In addition, the signal processing unit 140 is an example of an image generation unit, a recording controller, and a display controller disclosed in the embodiments.

The focus alignment determination unit 151 determines based on the phase difference detection data supplied from the signal processing unit 140 whether or not a focus is coincident with a to-be-focused target object (focus alignment target object). In the case where the focus is coincident with the object (focus alignment target object) in an area (focus area) where focusing is performed, the focus alignment determination unit 151 supplies information indicating that the focus is coincident as focus alignment determination result information to the lens driving amount generation unit 152. In addition, in the case where the focus is not coincident with the object (focus alignment target object) in the focus area, the focus alignment determination unit 151 calculates the focus shift amount (defocus amount) and sets information indicating the calculated defocus amount as the focus alignment determination result information.

The lens driving amount generation unit 152 generates a driving amount signal indicating the driving amount of the focus lens 113 based on the focus alignment determination result information output from the focus alignment determination unit 151. In the case where the focus is coincident, the lens driving amount generation unit 152 generates the driving amount signal for maintaining the current position of the focus lens 113. In addition, in the case where the focus is not coincident, the lens driving amount generation unit 152 calculates the driving amount (moving distance) of the focus lens 113 based on the focus alignment determination result information indicating the defocus amount and the position information of the focus lens 113. Next, the lens driving amount generation unit 152 generates the driving amount signal for moving (controlling) the focus lens 113 by the calculated driving amount and supplies the generated driving amount signal to the driving unit 153.

The driving unit 153 is configured to drive the zoom lens 111, the diaphragm 112, and the focus lens 113. For example, the driving unit 153 moves the focus lens 113 based on the driving amount signal supplied from the lens driving amount generation unit 152. For example, the driving unit 153 drives each motor for driving each lens according to a PID (Proportional Integral Differential) control method.

The storage unit 160 is configured to record the still image data supplied from the signal processing unit 140. For example, as the storage unit 160, a disk such as DVD (Digital Versatile Disk) or a removable recording medium such as a semiconductor memory such as a memory chart (one recording medium or a plurality of recording media) may be used. In addition, the recording medium may be built in the image capturing apparatus 100, or the recording medium may be detachably provided to the image capturing apparatus 100. In addition, the storage unit 160 is an example of a recording controller disclosed in the embodiments.

The display unit 170 is configured to display the image. For example, the display unit 170 is implemented with a color liquid crystal display panel. For example, in the case where live view image data are supplied from the signal processing unit 140, the display unit 170 displays a live view image.

[Example of Position of Operation Switching Filter]

Figure 2B:
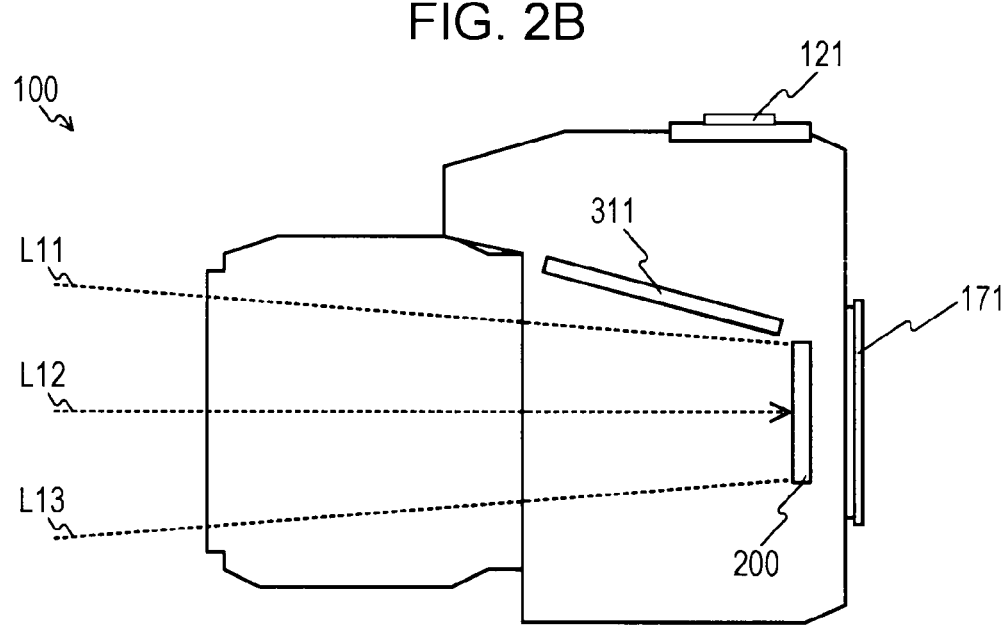

FIGS. 2A and 2B are schematic cross-sectional diagrams illustrating an example of a position of an operation switching filter with respect to subject light incident on the image capturing apparatus 100 according to the first embodiment of the present disclosure. In addition, in FIGS. 2A and 2B, the description is made under the assumption that the image capturing apparatus 100 is a single lens reflex camera.

FIG. 2A illustrates an example of a position of an operation switching filter (operation switching filter 311) in the case where a phase difference detection operation signal is supplied from a controller 130 (in the phase difference detection operation setting period). FIG. 2A is a cross-sectional diagram of the image capturing apparatus 100 and illustrates a shutter button (shutter button 121) which is not pressed, a display screen (a liquid crystal display screen 171) of the display unit 170, and an image sensor 200. In addition, FIG. 2A illustrates a filter (operation switching filter 311) of the operation switching filter insertion unit 300, an optical axis (axis L12) of a lens included in the lens unit 110, and two lines (lines L11 and L13) indicating a range through which the light passes. In addition, the range interposed between the lines L11 and L13 indicates a range through which the light incident on the image sensor 200 passes.

As illustrated in FIG. 2A, in the phase difference detection operation setting period, the operation switching filter 311 is inserted into the optical path of the subject light so that all the light incident on the image sensor 200 passes through the operation switching filter 311.

FIG. 2B illustrates an example of the position of the operation switching filter 311 in the case where a still image capturing operation signal is supplied from the controller 130 and a still image is captured (in the still image capturing operation setting period). Herein, since FIG. 2B is similar to FIG. 2A except that the position of the operation switching filter 311 is different and the shutter button 121 is pressed, the description is omitted.

As illustrated in FIG. 2B, in the still image capturing operation setting period, the operation switching filter 311 is detached from the optical path of the subject light so that all the light incident on the image sensor 200 does not pass through the operation switching filter 311.

In addition, in FIGS. 2A and 2B, although the operation switching filter 311 is illustrated so that the operation switching filter 311 together with the mirror of the single lens reflex camera is lifted up, the embodiment of the present disclosure is not limited thereto. For example, inside the main body of the single lens reflex camera, the operation switching filter 311 may be inserted into and detached from the optical path by sliding the operation switching filter 311 in the left/right direction or up/down direction. In addition, in the case of a lens-integrated camera, such a lens portion as a built-in ND filter may be configured so as to be inserted or detached.

[Example of Arrangement of Pixels in Image Sensor]

Figure 3:
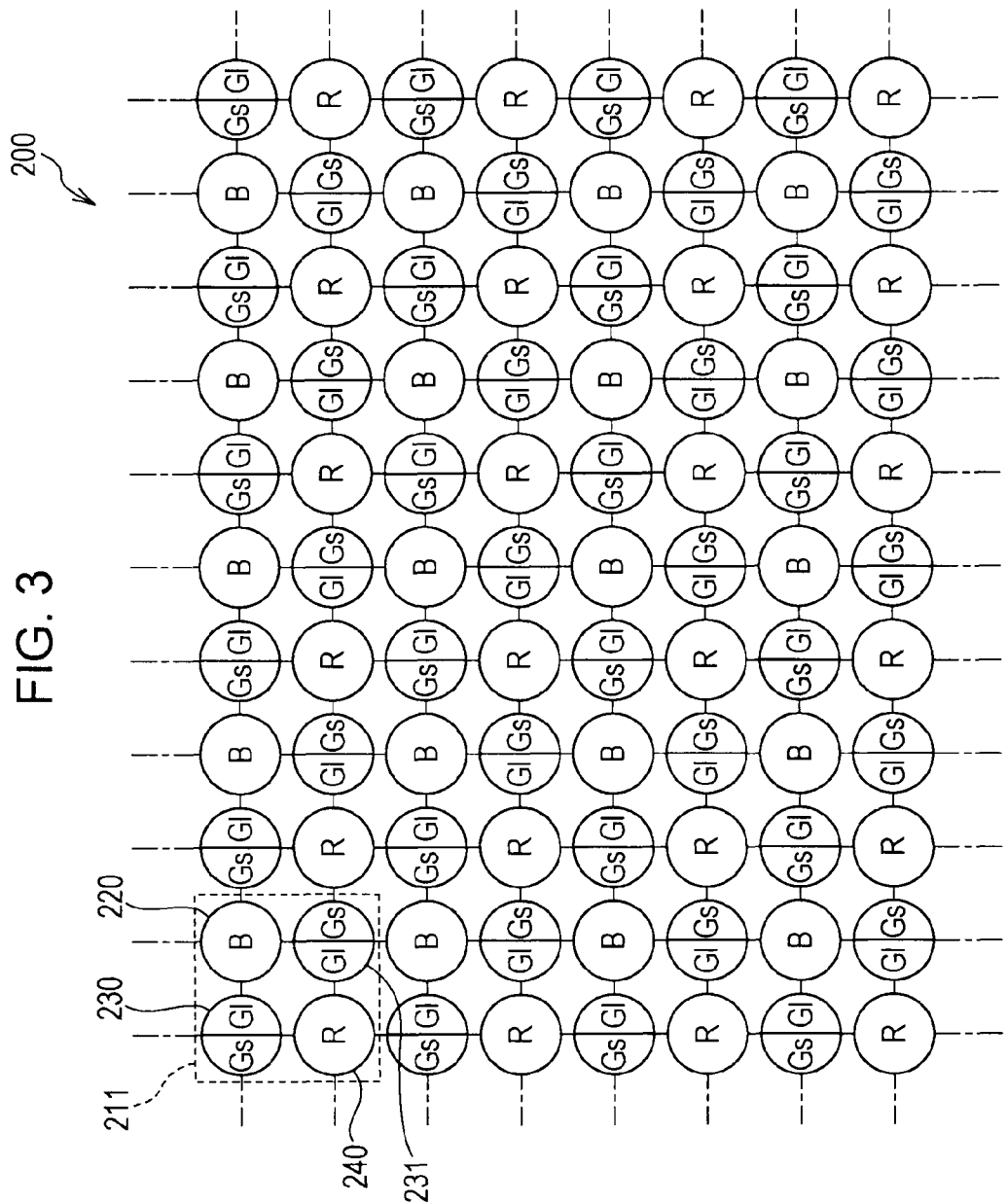
FIG. 3 is a schematic diagram illustrating an example of color arrangement of an on-chip color filter included in an image sensor according to the first embodiment of the present disclosure.

FIG. 3 is a schematic diagram illustrating an example of color arrangement of an on-chip color filter included in the image sensor 200 according to the first embodiment of the present disclosure. In FIG. 3, for convenience of the description, the description is made by using pixels (pixels of 8 rows×11 columns) as a portion of the pixels constituting the image sensor 200. In addition, in FIG. 3, one pixel is indicated by one circle, and reference numerals (R, Gs, G1, and B) indicating color filters which may be included in the pixel are written in the circle.

In addition, in FIG. 3, the description is made under the assumption of x and y axes that the left/right direction is set to the x axis and the up/down direction is set to the y axis. In addition, the signal reading direction of the image sensor 200 is set to the x axis direction (in other words, signals are read in units of a row).

FIG. 3 illustrates pixels (B (blue) pixels 220) including blue color filters and pixel (G (green) pixels 230 and 231) including two types of green color filters as the pixels of the image sensor 200. In addition, FIG. 3 also illustrates pixels (R (red) pixels 240) including red color filters as the pixels of the image sensor 200.

As illustrate in FIG. 3, the B pixels 220, the G pixels 230, the G pixels 231, and the R pixels 240 are disposed in an array so that the rows in which the B pixels 220 and the G pixels 230 are alternately arrayed and the rows in which the R pixels 240 and the G pixels 231 are alternately arrayed are alternated and repeated. In addition, the G pixels 230 and the G pixels 231 are disposed so as to be close to each other in the slant direction. In other words, the color arrangement of the on-chip color filters is configured in a Bayer array.

In other words, the image sensor 200, the pixel used for only the phase difference detection is not disposed.

Figure 4A:
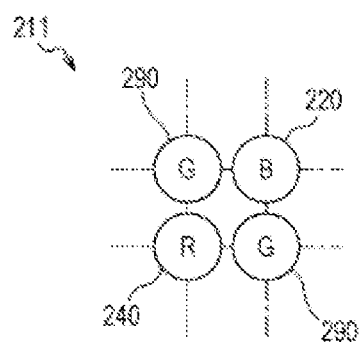
FIGS. 4A and 4B are schematic top views illustrating an example of color arrangement of an on-chip color filter in an area of the image sensor according to the first embodiment of the present disclosure and an example of color arrangement in the related art.
Figure 4B:
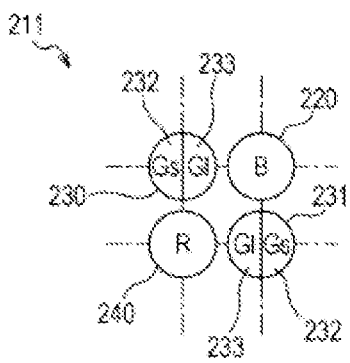

Next, the color arrangement according to the first embodiment of the present disclosure is described by paying attention on the pixels included in an area 211 (2 pixels×2 pixels) with reference to FIGS. 4A and 4B.

FIGS. 4A and 4B are schematic top views illustrating an example of the color arrangement of the on-chip color filter in the area 211 of the image sensor 200 according to the first embodiment of the present disclosure and an example of color arrangement in the related art.

In addition, in FIGS. 4A and 4B and the following figures, the description is made under the assumption of x and y axes that the left/right direction is set to the x axis and the up/down direction is set to the y axis. In addition, the signal reading direction is set to the x axis direction (in other words, signals are read in units of a row).

In FIG. 4A, the color arrangement of the on-chip color filters in the related art is illustrated by using the pixels of 2 rows×2 columns. In FIG. 4A, the pixels (G pixels 290) including one type of the green color filters are disposed in the left upper portion and the right upper portion; the R pixel 240 is disposed in the left lower portion; and the B pixel 220 is disposed in the right upper portion. In this manner, with respect to the on-chip color filters included in the image capturing pixels of the image sensor in the related art, the green color filters are one type, and three colors of blue, green, and red are disposed in a Bayer array.

In FIG. 4B, the color arrangement of the on-chip color filters according to the first embodiment of the present disclosure is illustrated by using the pixels of 2 rows×2 columns illustrated in the area 211 of FIG. 3. In FIG. 4B, the G pixel 230 is disposed in the left upper portion; the G pixel 231 is disposed in the right lower portion; the R pixel 240 is disposed in the left lower portion; and the B pixel 220 is disposed in the right upper portion.

Herein, the G pixel 230 and the G pixel 231 are described.

In the G pixel 230, the left half portion (minus side of the x axis) thereof is a surface (Gs (short wavelength green) filter surface 232) where the Gs (short wavelength green) filter is disposed. In addition, in the G pixel 230, the right half portion (plus side of the x axis) thereof is a surface (G1 (long wavelength green) filter surface 233) where the G1 (long wavelength green) filter is disposed. On the other hand, in the G pixel 231, the left half portion (minus side of the x axis) thereof is a G1 filter surface 233, and the right half portion (plus side of the x axis) thereof is a Gs filter surface 232. In addition, the G pixels 230 and 231 are examples of a first pixel and a second pixel disclosed in the embodiments.

In this manner, in the image sensor 200, two G pixels (G pixel 230 and G pixel 231), where the positions of the two types of color filters in the pixels are opposite to each other, are disposed. In other words, in the G pixels 230 and 231, the Gs filter and the G1 filter are disposed side by side. In addition, the G pixel 231 is the pixel obtained by switching the positions of the filters of the G pixel 230. In addition, the Gs (short wavelength green) filter and the G1 (long wavelength green) filter will be described with reference to FIGS. 5A and 5B.

[Example of Spectral Characteristics of On-Chip Color Filter]

Figure 5A:
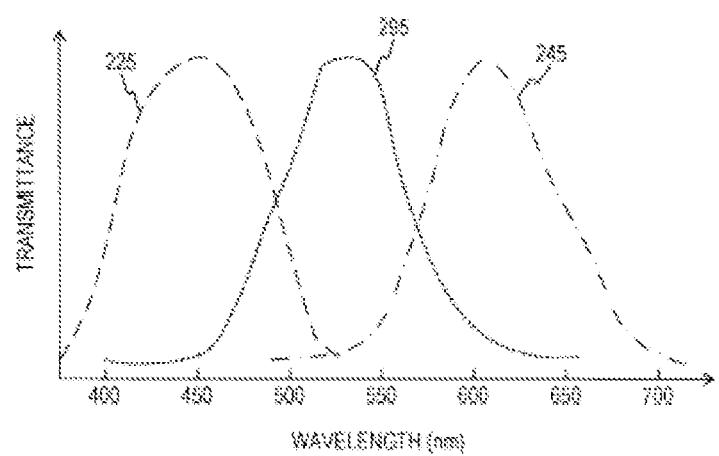
FIGS. 5A and 5B are graphs illustrating an example of spectral characteristics of the on-chip color filters according to the first embodiment of the present disclosure and an example of spectral characteristics of on-chip color filters in the related art.
Figure 5B:
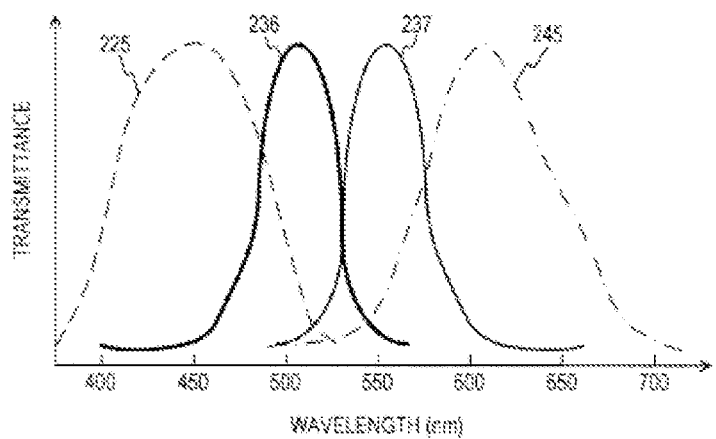

FIGS. 5A and 5B are graphs illustrating an example of spectral characteristics of the on-chip color filters according to the first embodiment of the present disclosure and an example of spectral characteristics of on-chip color filters in the related art.

In FIG. 5A, the spectral characteristics of the color filters in the on-chip color filters in the related art are illustrated in the graph where the horizontal axis is set to the axis indicating the wavelength of light and the vertical axis is set to the axis indicating transmittances of the filters. In FIG. 5A, as the characteristics of the color filters, characteristics of a blue filter (B (blue) filter 225), characteristics of a green filter (G (green) filter 295), and characteristics of a red filter (R (red) filter 245) are illustrated.

The B (blue) filter 225 is a filter having a high transmittance with respect to the light in the wavelength range of from about 400 nm to about 500 nm. In other words, the pixel (B pixel 220 in FIG. 2A) covered with the B (blue) filter 225 receives the light in the wavelength range of from about 400 nm to about 500 nm.

The G (green) filter 295 is a filter of which the transmittance with respect the light in the wavelength range of from about 470 nm to about 580 nm is high. In other words, the pixel (G pixel 290 in FIG. 2A) covered with the G (green) filter 295 receives the light in the wavelength range of from about 470 nm to about 580 nm.

The R (red) filter 245 is a filter of which the transmittance with respect to the light in the wavelength range of from about 560 nm to about 660 nm is high. In other words, the pixel (R pixel 240 in FIG. 2A) covered with the R (red) filter 245 receives the light in the wavelength range of from about 470 nm to about 570 nm.

In this manner, in the on-chip color filters in the related art, one of the three filters having different spectral sensitivities (spectral characteristics) is disposed in each pixel.

In FIG. 5B, the spectral characteristics of the on-chip color filters according to the first embodiment of the present disclosure are illustrated in the graph where the horizontal axis is set to the axis indicating the wavelength of light and the vertical axis is set to the axis indicating transmittances of the filters. In FIG. 5B, as the characteristics of the color filters, characteristics of a B (blue) filter 225, characteristics of a Gs filter (Gs (short wavelength green) filter 236), characteristics of a G1 filter (G1 (long wavelength green) filter 237), and characteristics of a R (red) filter 245 are illustrated.

In addition, since the characteristics of the B (blue) filter 225 and the R (red) filter 245 are the same as those illustrated in FIG. 5A, the description is omitted.

The Gs (short wavelength green) filter 236 is a filter of which the transmittance with respect to the light in the wavelength range of from about 470 nm to about 525 nm is high. The Gs (short wavelength green) filter 236 has a high transmittance with respect to the light in the wavelength range, which is shorter than the wavelength (525 nm) substantially two-dividing the light (from about 470 nm to about 580 nm) which the G (green) filter 295 illustrated in FIG. 5A mainly transmits.

The G1 (long wavelength green) filter 237 is a filter of which the transmittance with respect to the light in the wavelength range of from about 525 nm to about 580 nm is high. The G1 (long wavelength green) filter 237 has a high transmittance with respect to the light in the wavelength range, which is longer than the wavelength (525 nm) substantially two-dividing the light which the G (green) filter 295 illustrated in FIG. 5A mainly transmits. In addition, the Gs filter 236 and the G1 filter 237 are examples of a first filter and a second filter disclosed in the embodiments.

In this manner, the Gs filter 236 and the G1 filter 237 are the filters having spectral characteristics where the light in the one wavelength range among the wavelength ranges obtained by two-dividing the green light, which the G filter 295 transmits, is transmitted (the light other than light in the one wavelength range is blocked). In other words, the pixel (G pixel 230) including the Gs filter 236 and the G1 filter 237 in the half portions thereof receives the light (from about 470 nm to about 525 nm) transmitting through the Gs filter 236 and the light (from about 525 nm to about 580 nm) transmitting through the G1 filter 237. Since the light of from about 525 nm to about 580 nm among the light incident on the surface of the Gs filter 236 is blocked and the light of from about 470 nm to about 525 nm among the light incident on the surface of the G1 filter 237 is blocked, the G pixel 230 receives a smaller amount of light than the G pixel 290 in the related art.

In addition, the wavelengths illustrated in FIGS. 5A and 5B are exemplary ones. With respect to the Gs filter 236 and the G1 filter 237, as illustrated in FIGS. 5A and 5B, the filters may be filters by which the wavelength received by the G pixel is divided into two wavelengths.

[Example of Configuration of Pixels]

FIGS. 6A, 6B, 7A, and 7B are schematic top views illustrating an example of a pixel according to the first embodiment of the present disclosure and an example of a focus detection pixel in the related art.

Figure 6A:
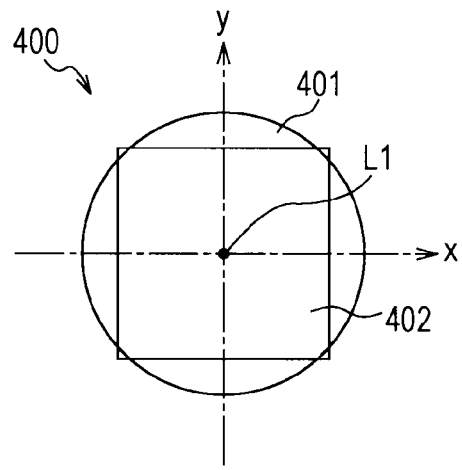
FIGS. 6A and 6B are a top view (pixel) illustrating a common structure of a B pixel, a G pixel, a G pixel, and a R pixel and a top view illustrating a light blocking portion which blocks incidence of light on the B pixel and the R pixel and an opening portion on which light is incident according to the first embodiment of the present disclosure.
Figure 6B:
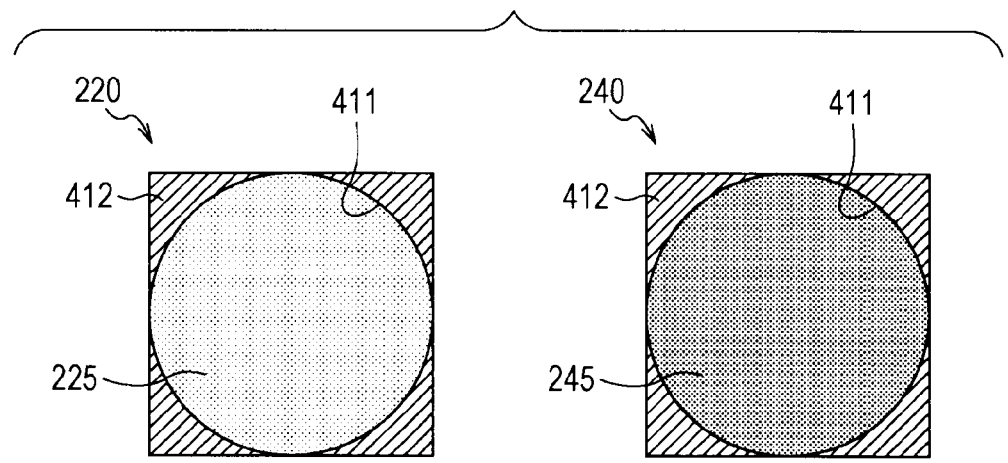

FIGS. 6A and 6B are a top view (pixel 400) illustrating a common structure of a B pixel 220, a G pixel 230, a G pixel 231, and a R pixel 240 and a top view illustrating a light blocking portion which blocks incidence of light on the B pixel 220 and the R pixel 240 and an opening portion on which light is incident according to the first embodiment of the present disclosure.

FIG. 6A illustrates an example of an image from the upper surface of a pixel (pixel 400) illustrating a structure common to the B pixel 220, the G pixel 230, the G pixel 231, and the R pixel 240. FIG. 6A illustrates a microlens (microlens 401) disposed on the pixel 400 and a light receiving device 402 of the pixel 400. In FIG. 6A, the description is made under the assumption of x and y coordinates that the intersection of the axis L1, which passes through the central position of the microlens 401 and is parallel to the optical axis direction, and the light receiving surface of the light receiving device 402 is set as the origin and the long side direction of the image sensor 200 is set to the x axis and the short side direction thereof is set to the y axis.

The microlens 401 is configured to collect the light (subject light), which is illuminated on the pixel 400, to the light receiving device 402. The microlens 401 is disposed so that the center of the microlens 401 and the center of the light receiving device 402 are located on the same axis.

The light receiving device 402 is configured to convert (photoeletrically converting) the received light into an electrical signal to generate the electrical signal having the intensity according to an amount of the received light. For example, the light receiving device 402 is constructed with a photodiode (PD).

In this manner, the B pixel 220, the G pixel 230, the G pixel 231, and the R pixel 240 are implemented by providing different filters to the pixel having the same configuration.

FIG. 6B illustrates top views of the B pixel 220 and the R pixel 240 by concentrating attention on portions (opening portions 411) on which light is incident and portions (light blocking portions 412) by which light is blocked. In addition, FIG. 6A illustrates the filters (B filter 225 and R filter 245) of the B pixel 220 and the R pixel 240.

The opening portion 411 is formed in a circular shape having a size equal to that of the microlens 401 so that the light collected by the microlens 401 is not blocked and unnecessary light is not incident.

On the other hand, the light blocking portion 412 is formed so that unnecessary light is not incident on the circumference of the opening portion 411.

In addition, the B filter 225 and the R filter 245 are formed so that all the light passing through the microlens 401 is passed and so that the entire surface of the opening portion 411 is covered.

As illustrated in FIG. 6B, the light incident on the light receiving device 402 of the B pixel 220 passes through the B filter 225, and the light incident on the light receiving device 402 of the R pixel 240 passes through the R filter 245.

Figure 7A:
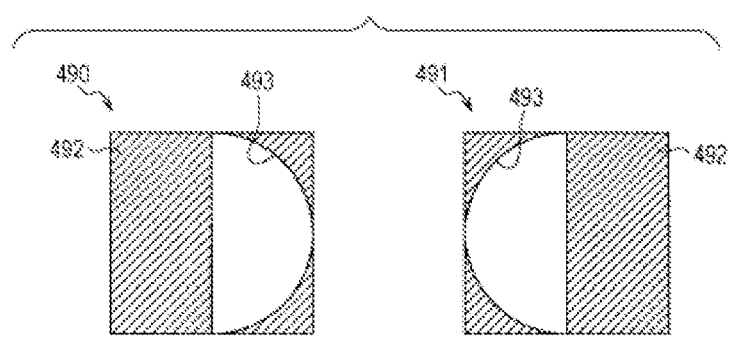
FIGS. 7A and 7B are top views illustrating pixels (focus detection pixels) which generate output signals used for phase difference detection in the related art and pixels (G pixel and G pixel) which generate output signals used for phase difference detection according to the first embodiment of the present disclosure.
Figure 7B:
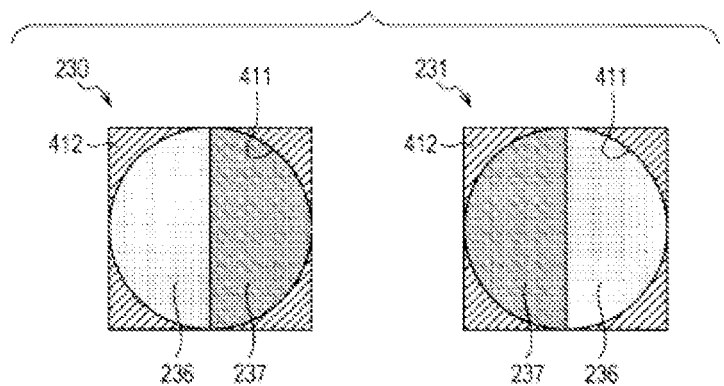

FIGS. 7A and 7B are top views illustrating pixels (focus detection pixels) which generate output signals used for phase difference detection in the related art and pixels (G pixel 230 and G pixel 231) which generate output signals used for phase difference detection according to the first embodiment of the present disclosure.

FIG. 7A illustrates a top view of the focus detection pixels (focus detection pixels 490 and 491) in the related art by concentrating attention on portions (opening portions 493) on which light is incident and portions (light blocking portions 492) by which light is blocked. In addition, the structure of the pixels is assumed to be the same as that of the pixel 400 illustrated in FIG. 6A.

With respect to the focus detection pixel 490, the left half portion (minus side of the x axis) thereof is entirely blocked, and the right half portion (plus side of the x axis) thereof is opened in the shape of the right half portion of the microlens.

On the other hand, with respect to the focus detection pixel 491, the left half portion (minus side of the x axis) thereof is opened in the shape of the left half portion of the microlens, and the right half portion (plus side of the x axis) thereof is entirely blocked.

As illustrated in FIG. 7A, with respect to the phase difference detection in the related art, the phase difference detection is performed by using the opened opposite pixels (the focus detection pixel 490 and the focus detection pixel 491).

FIG. 7B illustrates top views of the G pixel 230 and the G pixel 231 by concentrating attention on portions (opening portions 411) on which light is incident and portions (light blocking portions 412) by which light is blocked. In addition, FIG. 7B illustrates the Gs filter 236 and the G1 filter 237 included in the G pixel 230 and the G pixel 231.

The opening portion 411 and the light blocking portion 412 in the G pixel 230 and the G pixel 231 are the same as the B pixel 220 and the G pixel 240 illustrated in FIG. 6B.

In addition, as illustrated in FIG. 7B, with respect to the G pixel 230, the left half portion thereof (by using a straight line (y axis) passing through the center of the light receiving device 402 illustrated in FIG. 6A as a division line) is covered with the Gs filter 236, and the right half portion thereof is covered with the G1 filter 237. On the other hand, with respect to the G pixel 231, the left half portion thereof is covered with the G1 filter 237, and the right half portion thereof is covered with the Gs filter 236.

In other words, the G pixel 230 and the G pixel 231 are the same as the B pixel 220 and the R pixel 240 except that the G pixel 230 and the G pixel 231 include the two types of filters. On the contrary, with respect to the pixels (focus detection pixels 490 and 491) used for the phase difference detection in the related art, the size of the light blocking portions 492 and the like are different.

[Example of Configuration of Pixel of Detecting Phase Difference]

Figure 8A:
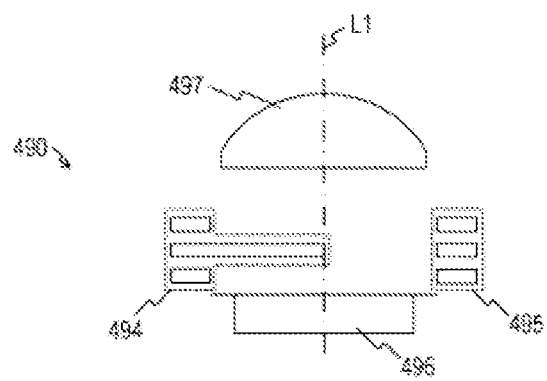
FIGS. 8A and 8B are schematic cross-sectional diagrams illustrating an example of the G pixel according to the first embodiment of the present disclosure and an example of the focus detection pixel in the related art.
Figure 8B:
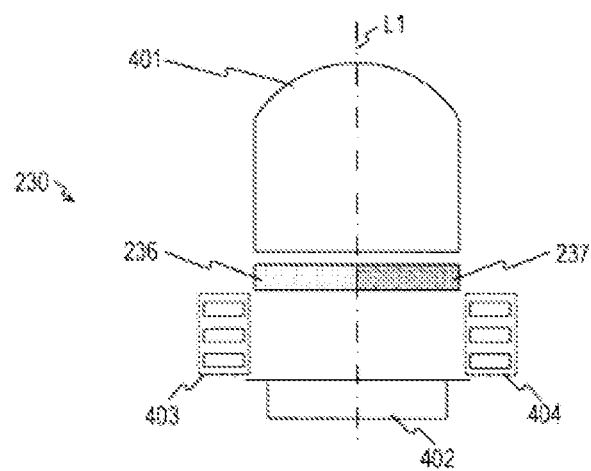

FIGS. 8A and 8B are schematic cross-sectional diagrams illustrating an example of the G pixel 230 according to the first embodiment of the present disclosure and an example of the focus detection pixel 490 in the related art.

In addition, in the first embodiment of the present disclosure, the image sensor 200 is a front surface illumination type image capturing device.

FIG. 8A schematically illustrates a cross-sectional configuration of a pixel (focus detection pixel 490) used for the phase difference detection in the related art. FIG. 8A illustrates a cross-sectional configuration in the case where the left/right direction of FIG. 8A is set to the left/right direction (x axis direction) of the focus detection pixel 490 illustrated in FIG. 7A.

FIG. 8A illustrates a cross-sectional diagram of the focus detection pixel 490 by concentrating attention on wire lines (wire line 494 and wire line 495) for connection to circuits and a light receiving device 496 in the focus detection pixel 490. In addition, a microlens 497 which collects the light incident on the focus detection pixel 490 to the light receiving device 496 is illustrated above the focus detection pixel 490.

In addition, in FIG. 8A, the focus detection pixel 490 is assumed to include no color filter.

The wire line 494 and the wire line 495 are wire lines for connection to the circuits in the focus detection pixel 490. In FIG. 8A, with respect to each of the wire line 494 and the wire line 495, three wire lines are disposed in a layer structure in the direction of the optical axis. In addition, in the image sensor 200, the wire line 494 and the wire line 495 are disposed on the front surface side (the side where the microlens 497 is disposed with respect to the light receiving device 496) of the image sensor 200. In other words, the wire line 494 and the wire line 495 are disposed between the microlens 497 and the light receiving device 496. The wire line 494 and the wire line 495 have functions of blocking light.

In the wire line 494, one wire line which protrudes to the position near the optical axis (axis L1) of the microlens 497 is included. The protrusion is made between the light receiving device 496 and the microlens 497 so that the left half portion of the light receiving device 496 is covered.

On the other hand, the wire line 495 is not disposed on the optical path of the subject light from the microlens 497 to the light receiving device 496 but disposed in the periphery of the optical path.

In this manner, since the wire line 494 is configured so as to block light and the wire line 495 is configured so as not to block light, the focus detection pixel 490 is illustrated by the top view illustrated in FIG. 7A.

In addition, since the focus detection pixel 491 is the same as the focus detection pixel 490 except that the protruding wire line is in the side of the wire line 495, the description thereof is omitted.

FIG. 8B illustrates a schematic cross-sectional configuration of the G pixel 230. FIG. 8B illustrates a cross-sectional configuration in the case where the left/right direction of FIG. 8B is set to the left/right direction (x axis direction) of the G pixel 230 illustrated in FIG. 7B.

FIG. 8B illustrates a cross-sectional diagram of the G pixel 230 by concentrating attention on wire lines (wire line 403 and wire line 404) for connection to circuits a light receiving device 402, a Gs filter 236, and a G1 filter 237 in the G pixel 230. In addition, a microlens 401 which collects the light incident on the G pixel 230 to the light receiving device 402 is illustrated above the G pixel 230.

Similarly to the wire line 494 and the wire line 495 illustrated in FIG. 8A, the wire line 403 and the wire line 404 are wire lines for connection to the circuits in the G pixel 230. In FIG. 8B, with respect to each of the wire line 403 and the wire line 404, three wire lines are disposed in a layer structure in the direction of the optical axis. In addition, similarly to the wire line 494 and the wire line 495, the wire line 403 and the wire line 404 are disposed between the microlens 401 and the light receiving device 402 to have function of blocking light.

The wire line 403 and the wire line 404 are not disposed on the optical path of the light from the microlens 401 to the light receiving device 402 but disposed in the periphery of the optical path. In this manner, since the wire line 403 and the wire line 404 are configured so as not to block light, the G pixel 230 is illustrated by the top view illustrated in FIG. 7B.

In addition, in the G pixel 230, the surface (upper spherical surface) of the microlens 401, on which the incident light is incident, is located at a position further apart from the light receiving device 402 in comparison with the surface of the microlens 497 illustrated in FIG. 8A. The position is a position so that the light incident from the left side of the microlens 401 passes through the G1 filter 237 and the light incident from the right side passes through the Gs filter 236. In other words, the Gs filter 236 and the G1 filter 237 are disposed at a position between the microlens 401 and the light receiving device 496 so that the light is divided to form a pair of pupil-divided images.

In addition, since the G pixel 231 is the same as the G pixel 230 except that the positions of the Gs filter 236 and the G1 filter 237 are opposite, the description thereof is omitted.

The G pixels 230 and 231 illustrated in FIG. 8B are disposed in the image sensor 200 as the pixels for image-capturing green color and generating the output signal used for the phase difference detection.

[Example of Spectral Characteristics of Operation Switching Filter]

Figure 9:
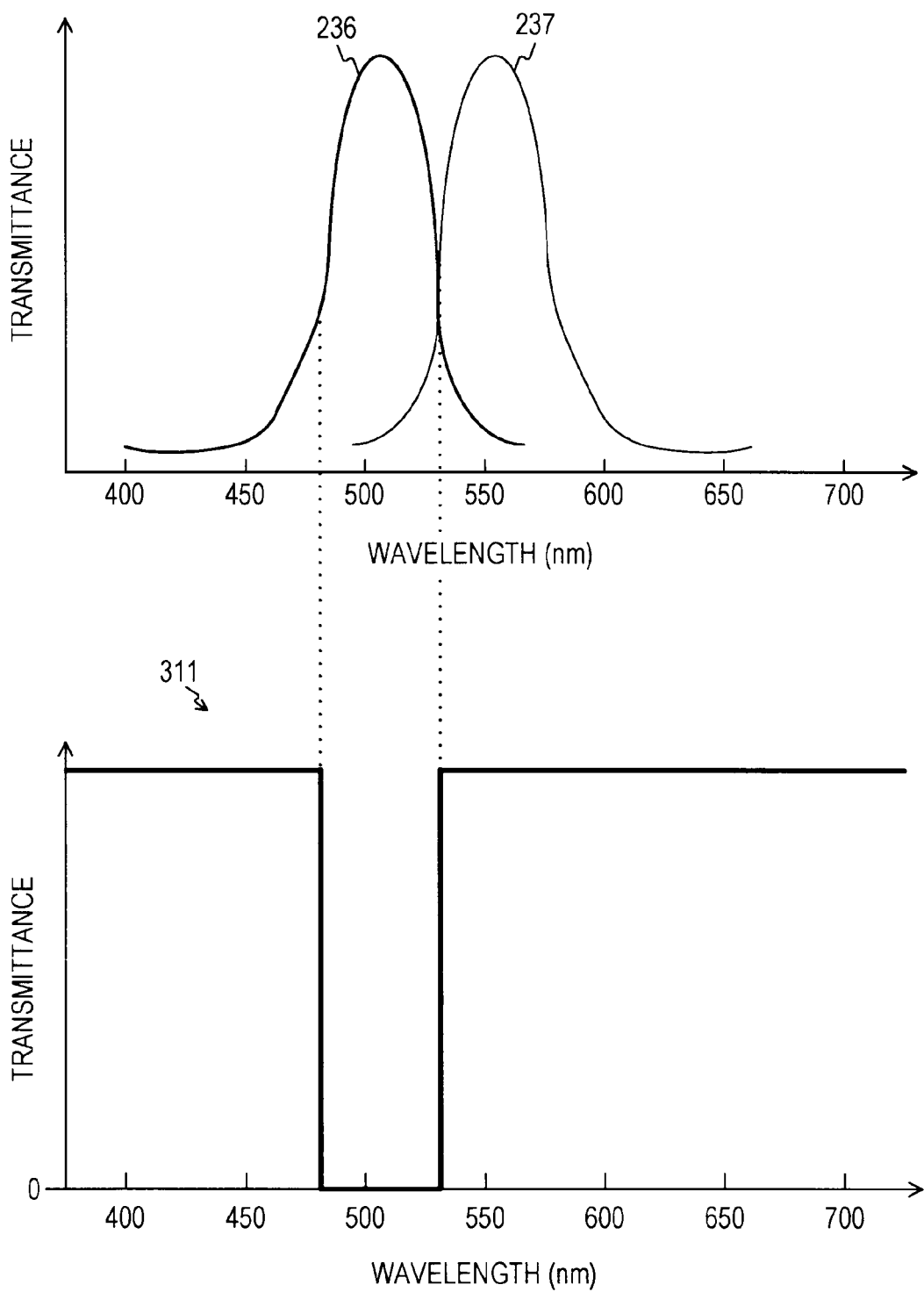
FIG. 9 is graphs illustrating an example of spectral characteristics of an operation switching filter according to the first embodiment of the present disclosure.

FIG. 9 is graphs illustrating an example of spectral characteristics of the operation switching filter 311 according to the first embodiment of the present disclosure.

In FIG. 9, the spectral characteristics of the Gs filter 236 and the G1 filter 237 illustrated in FIG. 5B are illustrated in the upper graph, and the spectral characteristics of the operation switching filter 311 are illustrated in the lower graph. In addition, since the vertical axes and the horizontal axes of the illustrated graphs are the same as those of the graphs illustrated in FIGS. 5A and 5B, the description thereof is omitted.

The operation switching filter 311 is an optical filter which blocks only the light in the wavelength range (from about 470 nm to about 525 nm) which the Gs filter 236 mainly transmits. In addition, the operation switching filter 311 is an example of a light blocking filter disclosed in the embodiments.

In the phase difference detection operation setting period, the operation switching filter 311 is inserted into the optical path of the subject light toward the image sensor 200. In addition, in the still image capturing operation setting period, the operation switching filter 311 is detached from the optical path of the subject light toward the image sensor 200.

[Example of Incident Light on G Pixel in Phase Difference Detection Operation]

Figure 10:
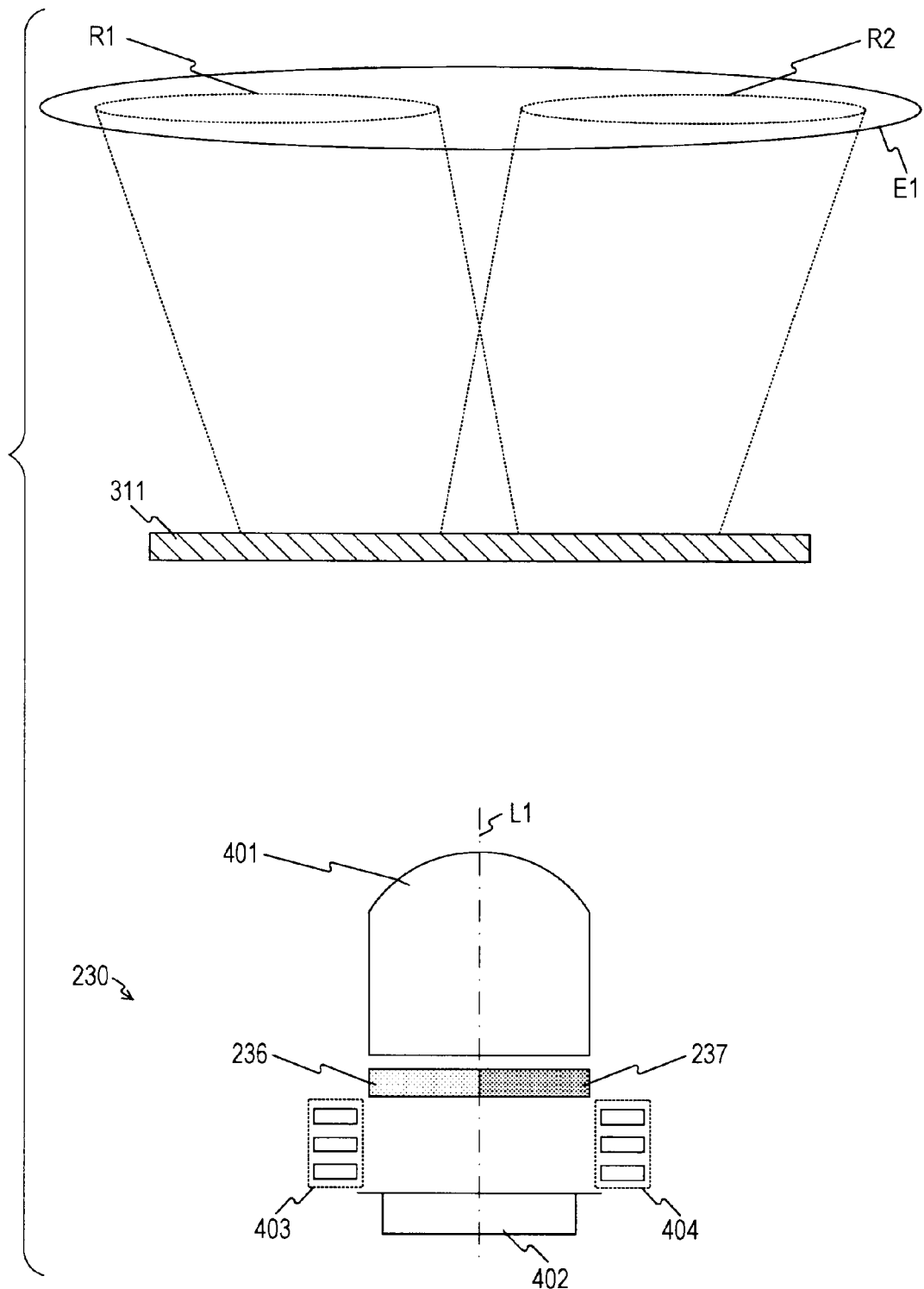
FIG. 10 is a schematic image diagram illustrating an optical path of Gs light toward the G pixel in a phase difference detection operation according to the first embodiment of the present disclosure.
Figure 11:
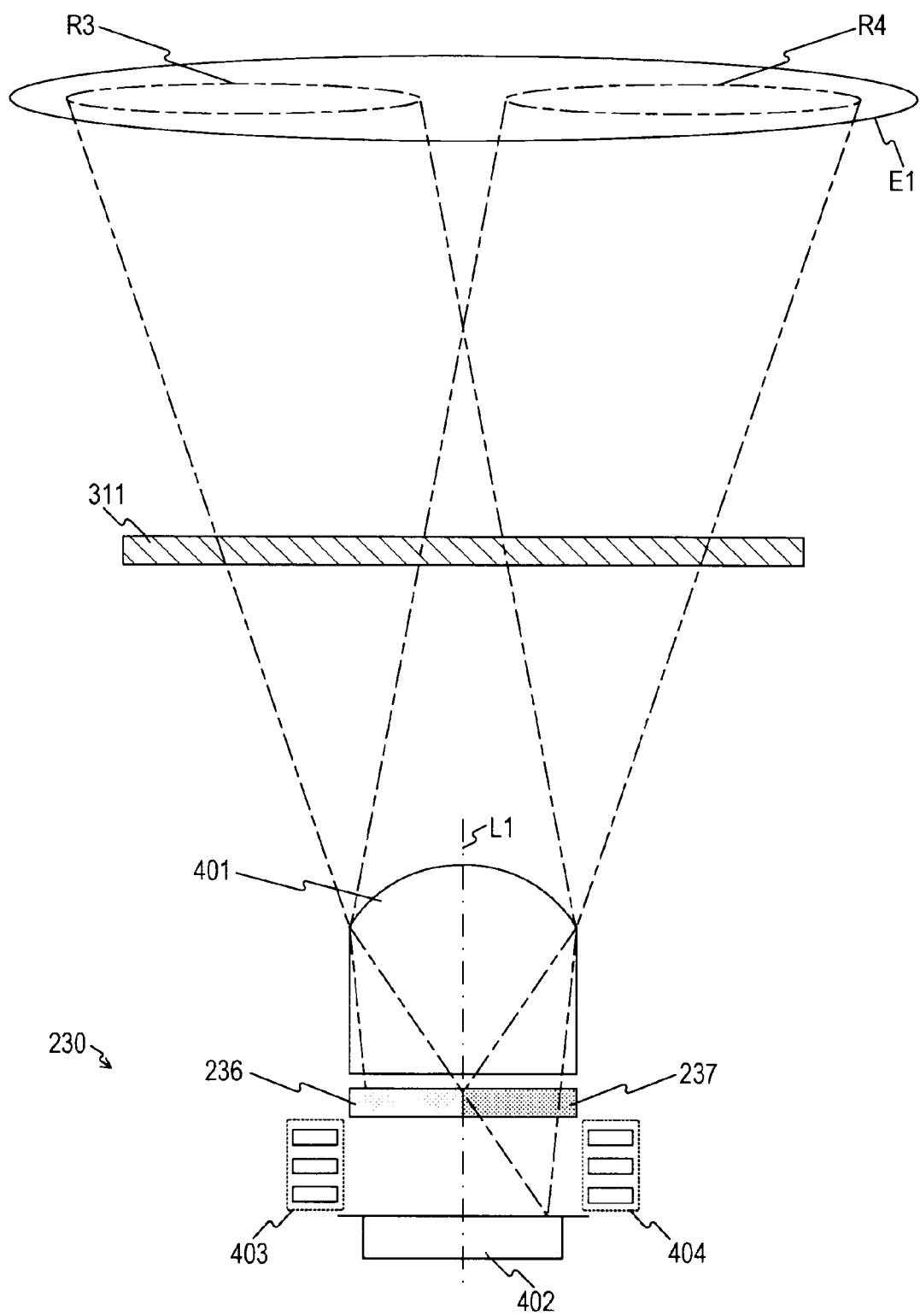
FIG. 11 is a schematic image diagram illustrating an optical path of G1 light toward the G pixel in the phase difference detection operation according to the first embodiment of the present disclosure.

With reference to FIGS. 10 and 11, the light incident on the G pixel in the phase difference detection operation according to the first embodiment of the present disclosure is described.

In addition, in FIGS. 10 and 11 and the following figures, the light of from 470 nm to 525 nm which the Gs filter 236 mainly transmits is referred to as Gs light, and the light of from 525 nm to 580 nm which the G1 filter 237 mainly transmits is referred to as G1 light.

FIG. 10 is a schematic image diagram illustrating an optical path of Gs light toward the G pixel 230 in the phase difference detection operation according to the first embodiment of the present disclosure.

FIG. 10 illustrates a cross-sectional diagram of the G pixel 230 and the microlens 401 illustrated in FIG. 8B and a cross-sectional diagram of the operation switching filter 311. In addition, FIG. 10 illustrates an emitting pupil E1, an area (area R1) which passes the Gs light received by the right half portion (plus side of the x axis) of the light receiving device 402, and an area (area R2) which passes the Gs light received by the left half portion (minus side of the x axis) of the light receiving device 402. In addition, the range where the Gs light passing through the area R1 and the area R2 passes is illustrated by an area sandwiched by the broken lines extending from the areas.

As illustrated in FIG. 10, in the phase difference detection operation setting period, the operation switching filter 311 is inserted from the lens unit 110 into the optical path to the image sensor 200. Therefore, the Gs light is blocked by the operation switching filter 311, and the Gs light is not received by the G pixel 230.

FIG. 11 is a schematic image diagram illustrating an optical path of G1 light toward the G pixel 230 in the phase difference detection operation according to the first embodiment of the present disclosure.

Since FIG. 11 is the same of FIG. 10 except that the G1 light is illustrated instead of the Gs light, the description of the configurations other than the G1 light is omitted.

In FIG. 11, instead of the area R1 and the area R2 illustrated in FIG. 10, an area (area R3) which passes the G1 light received by the right half portion of the light receiving device 402 and an area (area R4) which passes the G1 light received by the left half portion of the light receiving device 402 are illustrated. In addition, in FIG. 11, the range where the G1 light passing through the area R3 and the area R4 passes is illustrated by an area sandwiched by the broken lines extending from the areas. In addition, in terms of the position of the emitting pupil E1, the area R3 and the area R4 are the same as the area R1 and the area R2 illustrated in FIG. 10.

Now, the G1 light incident on the light receiving device 402 in the phase difference detection operation is described by concentrating attention on the filters through which the G1 light passes.

Since the G1 light does not have the wavelength which is blocked by the operation switching filter 311, the G1 light passes through the operation switching filter 311. Next, the G1 light is collected by the microlens 401 and reaches the Gs filter 236 and the G1 filter 237 which cover the half portions of the G pixel 230. Although the Gs filter 236 does not transmit the G1 light, since the G1 filter 237 transmits the G1 light, the light receiving device 402 receives only the G1 light which passes through the area R3.

[Example of Incident Light on G Pixel in Still Image Capturing Operation]

Figure 12:
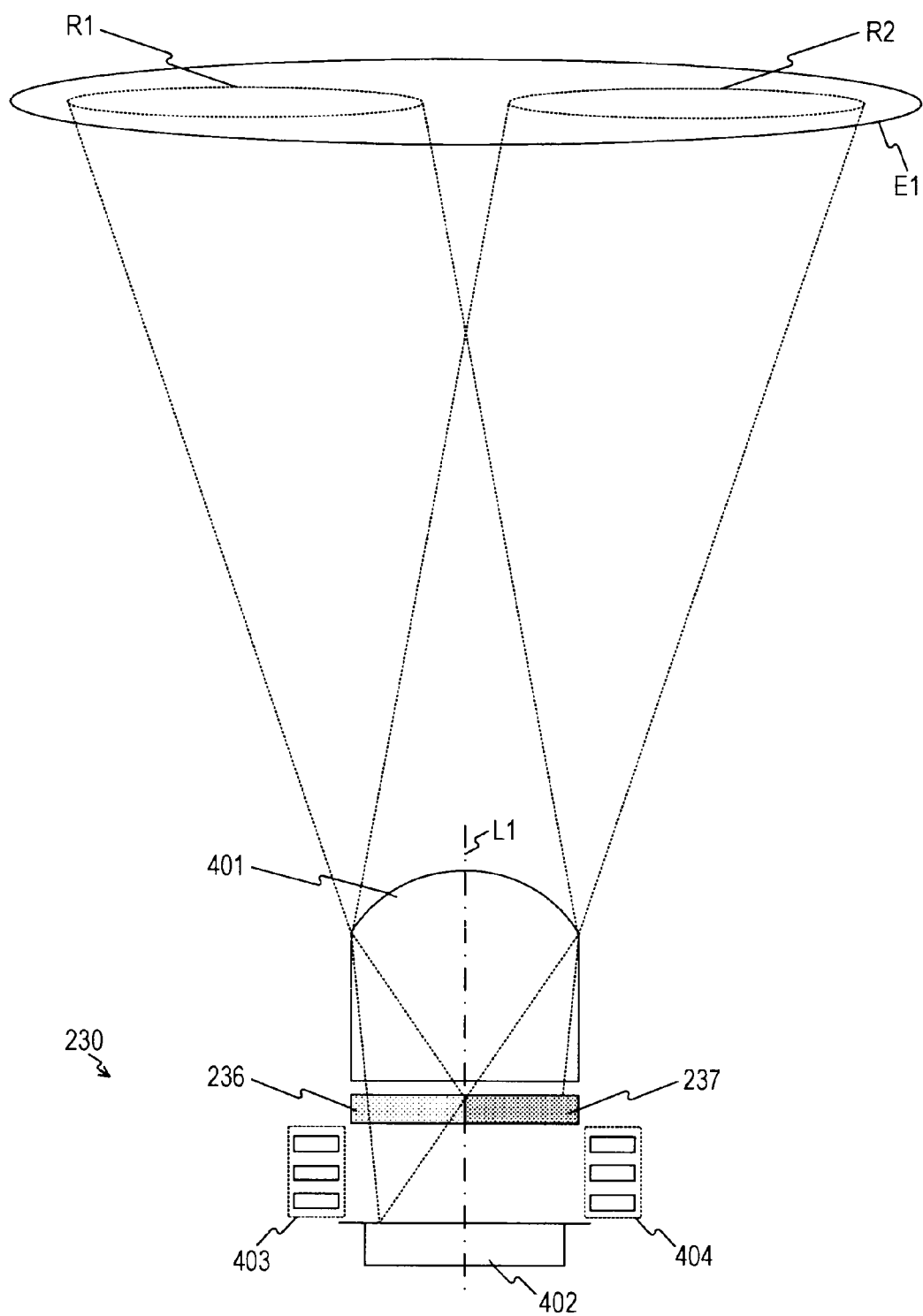
FIG. 12 is a schematic image diagram illustrating an optical path of the Gs light toward the G pixel in a still image capturing operation according to the first embodiment of the present disclosure.
Figure 13:
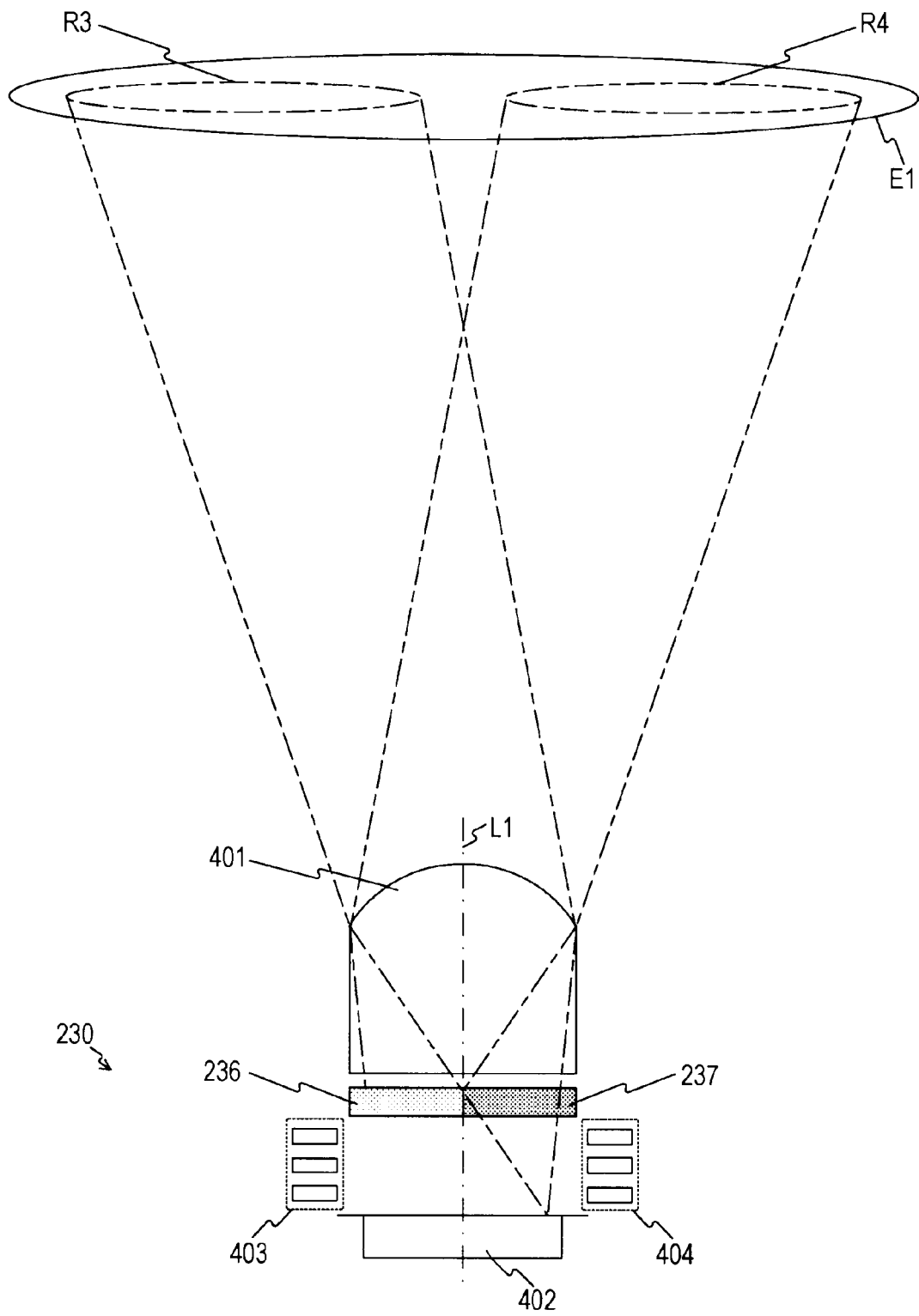
FIG. 13 is a schematic image diagram illustrating an optical path of the G1 light toward the G pixel in the still image capturing operation according to the first embodiment of the present disclosure.

With reference to FIGS. 12 and 13, the light incident on the G pixel in the still image capturing operation according to the first embodiment of the present disclosure is described.

FIG. 12 is a schematic image diagram illustrating an optical path of the Gs light toward the G pixel 230 in the still image capturing operation according to the first embodiment of the present disclosure.

Similarly to FIG. 11, FIG. 12 illustrates a cross-sectional diagram of the G pixel 230 and the microlens 401, and FIG. 12 also illustrates an emitting pupil E1, an area R1, an area R2, and Gs light passing through the area R1 and the area R2.

Now, the Gs light incident on the light receiving device 402 in the still image capturing operation is described by concentrating attention on the filters through which the Gs light passes.

Since the operation switching filter 311 is detached from the optical path in the still image capturing operation, the Gs light is not blocked at the position, where the operation switching filter 311 is inserted, and reaches the microlens

401. Next, the Gs light is collected by the microlens 401 and reaches the Gs filter 236 and the G1 filter 237 which cover the half portions of the G pixel 230. Although the Gs filter 236 transmits the Gs light, since the G1 filter 237 does not transmit the Gs light, the light receiving device 402 receives only the G1 light which passes through the area R2.

FIG. 13 is a schematic image diagram illustrating an optical path of the G1 light toward the G pixel 230 in the still image capturing operation according to the first embodiment of the present disclosure.

Since FIG. 13 is the same as FIG. 12 except that the G1 light is illustrated instead of the Gs light, description of the configurations other than the G1 light are omitted.

Now, G1 light incident on the light receiving device 402 in the phase difference detection operation is described by concentrating attention on the filters through which the G1 light passes.

The G1 light is collected by the microlens 401 and, after that, reaches the Gs filter 236 and the G1 filter 237. Although the Gs filter 236 does not transmit the G1 light, since the G1 filter 237 transmits the G1 light, the light receiving device 402 receives only the G1 light which passes through the area R3.

[Comparison of G Light Incident on G Pixel Between Phase Difference Detection Operation and Still Image Capturing Operation]

Figure 14:
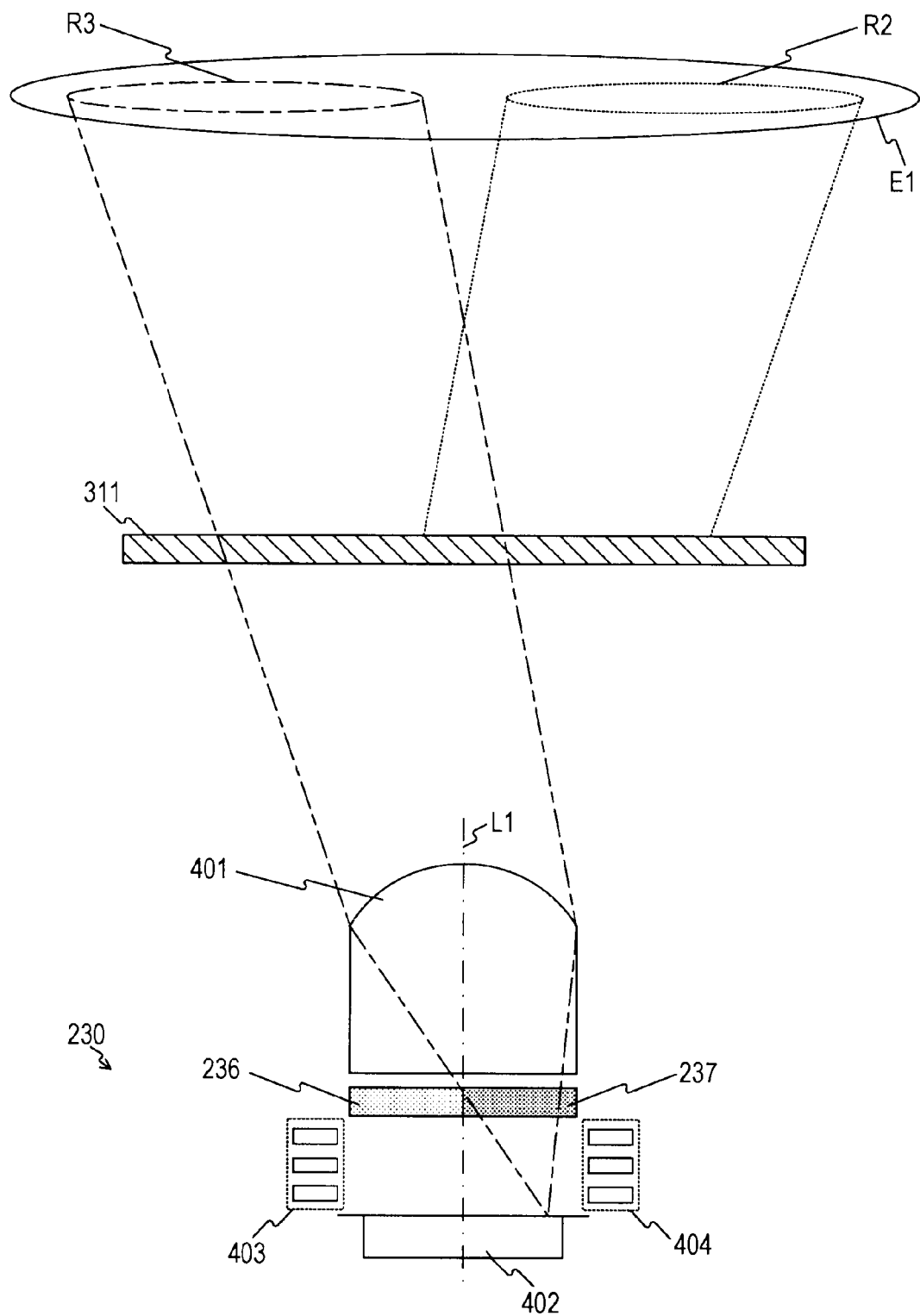
FIG. 14 is a schematic image diagram illustrating incident light on the G pixel in the phase difference detection operation according to the first embodiment of the present disclosure.
Figure 15:
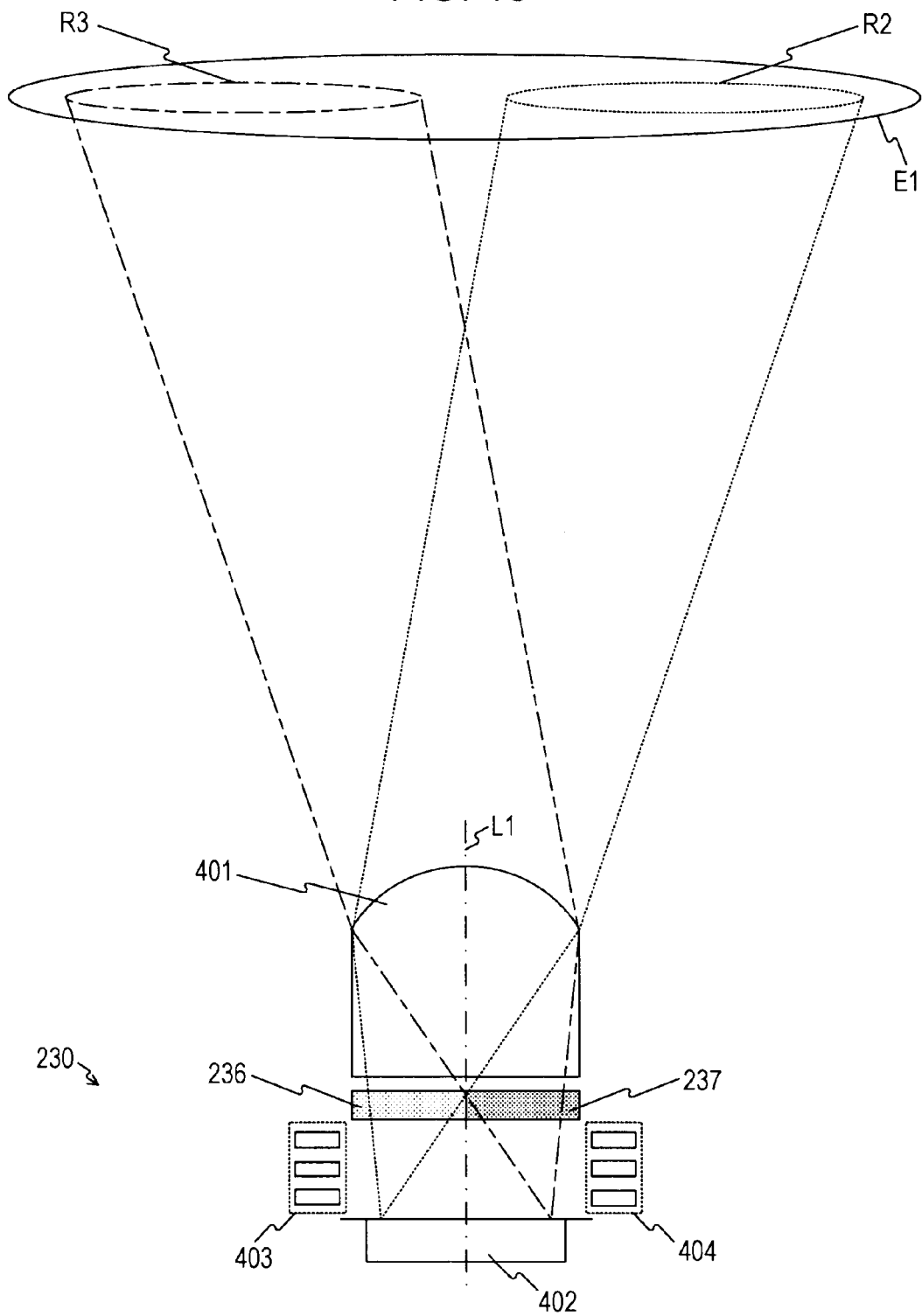
FIG. 15 is a schematic image diagram illustrating incident light on the G pixel in the still image capturing operation according to the first embodiment of the present disclosure.

With reference to FIGS. 14 and 15, the G light incident on the G pixel in the phase difference detection operation and the still image capturing operation according to the first embodiment of the present disclosure is described.

FIG. 14 is a schematic image diagram illustrating incident light on the G pixel 230 in the phase difference detection operation according to the first embodiment of the present disclosure. FIG. 14 collectively illustrates the contents described in FIGS. 10 and 11. In FIG. 14, the Gs light passing through the area R2 illustrated in FIG. 10 and the G1 light passing through the area R3 illustrated in FIG. 11 are illustrated.

As illustrated in FIG. 14, in the phase difference detection operation, the G pixel 230 receives only the G1 light passing through the area R3 which is the left side area in the emitting pupil E1.

In addition, since the position of the filter of the G pixel 231 is opposite to the position of the filter of the G pixel 230, the G pixel 231 receives only the G1 light passing through the area R4 which is the right side area in the emitting pupil E1.

FIG. 15 is a schematic image diagram illustrating incident light on the G pixel 230 in the still image capturing operation according to the first embodiment of the present disclosure.

FIG. 15 collectively illustrates the contents described in FIGS. 12 and 13. In FIG. 15, the Gs light passing through the area R2 illustrated in FIG. 12 and the G1 light passing through the area R3 illustrated in FIG. 13 are illustrated.

As illustrated in FIG. 15, in the still image capturing operation, the G pixel 230 receives the G1 light passing through the area R3 which is the left side area in the emitting pupil E1 and the Gs light passing through the area R2 which is the right side area in the emitting pupil E1.

In addition, since the position of the filter of the G pixel 231 is opposite to the position of the filter of the G pixel 230, the G pixel 231 receives the G1 light passing through the area R4 which is the right side area in the emitting pupil E1 and the Gs light passing through the area R1 which is the left side area in the emitting pupil E1.

Herein, the descriptions on the G light incident on the G pixel in the phase difference detection operation and the still image capturing operation are collectively made. As illustrated in FIG. 14, by inserting the operation switching filter 311 into the optical path of, the subject light toward the image sensor 200, the G pixel 230 receives only the G1 light passing through the left side of the emitting pupil E1, and the output signal is supplied based on the received G1 light. In addition, as illustrated in FIG. 15, by detaching the operation switching filter 311 from the optical path, the G pixel 230 receives the G1 light passing through the left side of the emitting pupil E1 and the Gs light passing through the right side of the emitting pupil E1, and the output signal is supplied based on the received G1 light.

In other words, in the case where the operation switching filter 311 is inserted into the optical path, the G pixel 230 functions as the phase difference detection pixel as illustrated in FIG. 14, and in the case where the operation switching filter 311 is detached from the optical path, the operation switching filter 311 functions as the image capturing pixel.

In addition, with respect to the G pixel 230, it is assumed that the focus of the microlens 401 is located on the front surface of the light receiving device 402, and the light passing through the right side of the emitting pupil E1 is received by the left half portion of the light receiving device 402, and the light passing through the left side of the emitting pupil E1 is received by the right half portion of the light receiving device 402. However, the embodiment of the present disclosure is not limited thereto, but the light passing through the right side of the emitting pupil E1 may pass through the Gs filter 236 to be received by the light receiving device 402, and the light passing through the left side of the emitting pupil E1 may pass through the G1 filter 237 to be received by the light receiving device 402. For example, the case or the like where the position of the focus of the microlens 401 is set to a position yet closer to the filter from the light receiving device 402 may be considered.

[Example of Phase Difference Detection]

FIGS. 16A to 16C are diagrams illustrating an example of the phase difference detection in the case where the focus is aligned with a position behind the subject according to the first embodiment of the present disclosure. FIGS. 16A to 16C schematically describe the flow to the time when the focus alignment determination unit 151 detects the focus shift based on image capturing data in the phase difference detection operation setting period.

In FIG. 16A, the phase difference detection data generated based on the output signal of the G pixel 230 are schematically illustrated in the graph where the horizontal axis is set to the pixel position of the G pixel 230 in the image sensor 200 and the vertical axis is set to the output grayscale indicating the intensity of the output signal of the G pixel 230. In the graph, with respect to the output signals of a plurality of the G pixels 230 arrayed in a predetermined one row (for example, refer to FIG. 3), the data (G pixel 230 output signal distribution data 511) indicating that the output signal of the G pixel 230 of which the position is in the right side of the image sensor 200 is strong are illustrated. The G pixel 230 output signal distribution data 511 indicate that the light, which the G pixel 230 in the central portion of the image sensor 200 detects in the focus alignment period, is detected by the G pixel 230 which is disposed in the right side of the image sensor 200 in the case where a focus is aligned with a position behind the subject.

Now, the output signal of the G pixel 230 in the phase difference detection operation setting period is described. Since the G pixel 230 receives the G1 light incident from the left side of the microlens 401 in the phase difference detection operation setting period, the graph of FIG. 16A illustrates the intensity distribution of the G1 light, which is incident from the left side of the emitting pupil (refer to the emitting pupil E1 of FIG. 11), in the row direction of the image sensor 200. In FIGS. 16A to 16C, since the image capturing apparatus is in the state where the focus is aligned with a position behind the subject, the light incident from the left side of the image capturing lens is received after the light further proceeds to the right side in comparison with the light of the focus alignment period. In other words, the G pixel 230 output signal distribution data 511 become the output signal distribution data obtained by shifting the output signal distribution data of the focus alignment period rightwards.

In FIG. 16B, the phase difference detection data generated based on the output signal of the G pixel 231 are schematically illustrated in the graph where the horizontal axis is set to the pixel position of the G pixel 231 in the image sensor 200 and the vertical axis is set to the output grayscale indicating the intensity of the output signal of the G pixel 231. In the graph, with respect to the output signals of a plurality of the G pixels 231 arrayed in one row close to the row of the G pixel 230 which outputs the phase difference detection data of FIG. 16A, the data indicating that the output signal of the G pixel 231 of which the position is in the left side of the image sensor 200 is strong are illustrated. The data (G pixel 231 output signal distribution data 512) indicate that the light, which the G pixel 231 detects in the central portion of the image sensor 200 in the focus alignment period, is detected by the G pixel 231 which is disposed in the left side of the image sensor 200 in the case where the focus is aligned with a position behind the subject.

Now, the output signal of the G pixel 231 in the phase difference detection operation setting period is described. Since the G pixel 231 receives the G1 light incident from the right side of the microlens 401 in the phase difference detection operation setting period, the graph of FIG. 16B illustrate the intensity distribution of the G1 light, which is incident from the right side of the emitting pupil (refer to the emitting pupil E1 of FIG. 11), in the row direction of the image sensor 200. In FIGS. 16A to 16C, since the image capturing apparatus is in the state where the focus is aligned with a position behind the subject, the light incident from the right side of the image capturing lens is received after the light further proceeds to the left side in comparison with the light of the focus alignment period. In other words, the G pixel 231 output signal distribution data 512 become the output signal distribution data obtained by shifting the output signal distribution data of the focus alignment period leftwards.

The phase difference detection data illustrated in FIGS. 16A and 16B are supplied from the signal processing unit 140 to the focus alignment determination unit 151.

In FIG. 16C, the contents of the process at the time of performing the focus detection are illustrated in the graph where the horizontal axis is set to the pixel positions of the G pixel 230 and the G pixel 231 in the image sensor 200 and the vertical axis is set to the output grayscales indicating the intensities of the output signals of the G pixel 230 and the G pixel 231. The graph illustrates the G pixel 230 output signal distribution data 511 illustrated in FIG. 16A and the G pixel 231 output signal distribution data 512 illustrated in FIG. 16B. In addition, the graph of FIG. 16C illustrates a peak shift (image interval A1) between the G pixel 230 output signal distribution data 511 and the G pixel 231 output signal distribution data 512.

Now, the focus alignment determination of the focus alignment determination unit 151 in the phase difference detection operation setting period is described. The focus alignment determination unit 151 calculates the image interval A1 and calculates the defocus amount from the calculated image interval A1. Next, the focus alignment determination unit 151 supplies information indicating the calculated defocus amount as the focus alignment determination result information to the lens driving amount generation unit 152.

In this manner, by inserting the operation switching filter 311 into the optical path of the subject light toward the image sensor 200, the focus alignment determination unit 151 may perform the focus alignment determination based on the output signals of the G pixel 230 and the G pixel 231.

[Example of Live View Image Generation]

Figure 17A:
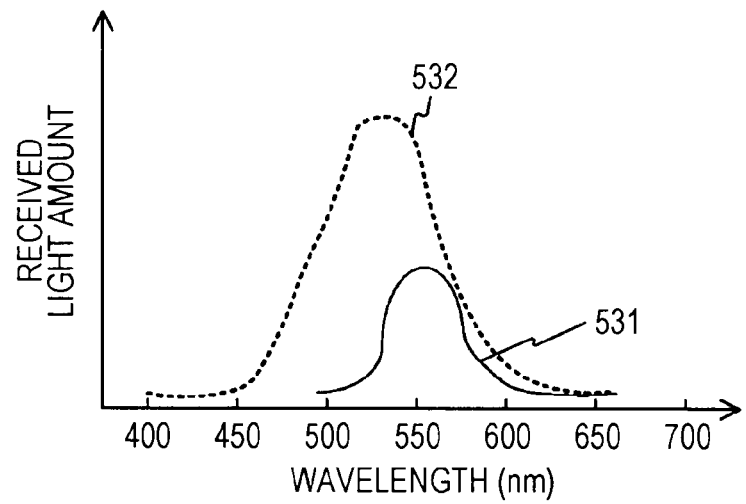
FIGS. 17A and 17B are diagrams illustrating an example of live view image generation in a signal processing unit according to the first embodiment of the present disclosure.
Figure 17B:
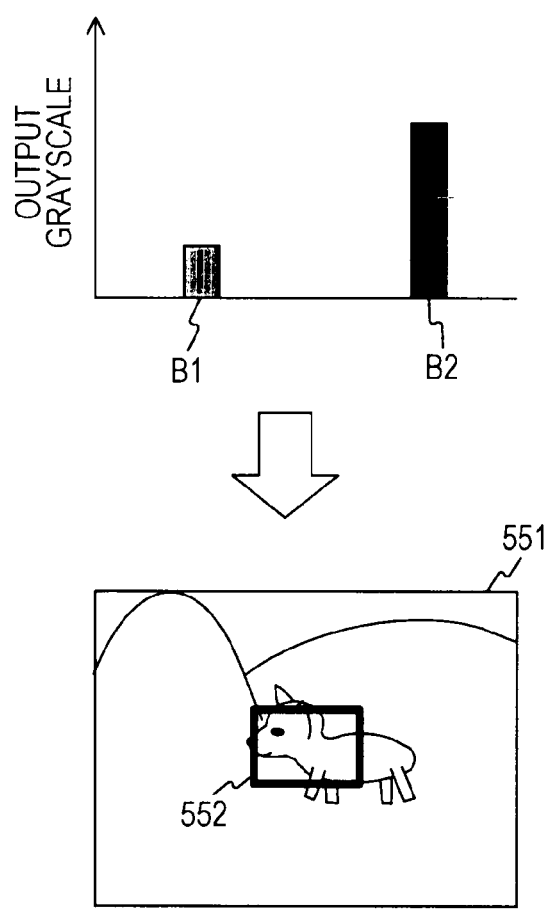

FIG. 17A and 17B are diagrams illustrating an example of live view image generation in the signal processing unit 140 according to the first embodiment of the present disclosure. In addition, in FIG. 17A, for convenience of the description, the subject light is assumed to have the same light amount in all the wavelengths. In addition, since the G pixel 231 is the same as the G pixel 230, only the G pixel 230 is described herein.

In FIG. 17A, the light received by the G pixel 230 in the phase difference detection operation setting period and the light received by the G pixel 230 in the correction process are schematically illustrated in a graph where the horizontal axis is set to the axis indicating the wavelength of the light and the vertical axis is set to the axis indicating the amount of the light received by the G pixel 230. FIG. 17A illustrates a curve (received light amount 531 of the G pixel 230) indicating the amount of the light received by the G pixel 230 in each of the wavelength and a curve (corrected received light amount 532) indicating the amount of the light received by the G pixel 230 through the correction of the light amount indicated by the received light amount 531 of the G pixel 230.

The received light amount 531 of the G pixel 230 indicates an amount of the light which the G pixel 230 receives in the phase difference detection operation period in each wavelength of the light. In FIG. 17A, since the light having the same light amount in all the wavelengths is the subject light, the received light amount 531 of the G pixel 230 illustrates the same curve as the spectral characteristics of the G1 filter 237 illustrated in FIGS. 5A and 5B.

The corrected received light amount 532 indicates an amount of the light which the G pixel 230 receives in the correction process of the signal processing unit 140 based on the received light amount 531 of the G pixel 230 in each wavelength of the light. The corrected received light amount 532 illustrates a curve which is the same as the curve indicating the amount of the light received by the G pixel (refer to the G pixel 290 in FIGS. 4A and 4B), which includes the G filter (refer to the G filter 295 in FIGS. 5A and 5B) in the related art, in each wavelength. In addition, the corrected received light amount 532 illustrates the light amounts close to the amount of the light received by the G pixel of which the entire surface is covered with the G filter in the related art. In other words, the signal processing unit 140 performs the correction, which calculates the light amount received by the G pixel including the G filter in the related art, based on the light amount received by the G pixel 230 in the phase difference detection operation period.

FIG. 17B schematically illustrates the output signal of the G pixel 230, which is corrected in the correction process as illustrated in FIG. 17A, and the live view image displayed on the display unit 170. The bar graph illustrated in FIG. 17B illustrates the output signal (output signal B1 of the G pixel 230) of the G pixel 230 and the signal (corrected signal B2) after the correction process with respect to the output signal B1 of the G pixel 230, wherein the vertical axis is set to the axis indicating the grayscale of the output signal. In addition, the image illustrated in FIG. 17B schematically illustrates the live view image (live view image 551) which is displayed on the display unit 170.

The output signal B1 of the G pixel 230 schematically illustrates the output signal which the G pixel 230 generates by receiving the light amount indicated by the received light amount 531 of the G pixel 230 illustrated in FIG. 17A.

The corrected signal B2 schematically illustrates the output signal generated by correcting the output signal B1 of the G pixel 230 so as to become the output signal when the light amount illustrated in the corrected received light amount 532 illustrated in FIG. 17A is received. The output signal B1 of the G pixel 230 is the output signal according to the G1 light passing through the half surface of the G pixel 230, but the corrected signal B2 is the output signal according to the Gs light and the G1 light passing through the entire surface of the G pixel 230. Therefore, in comparison with the output signal B1 of the G pixel 230, the corrected signal B2 becomes a signal having a high grayscale value (for example, about four time value). In other words, the signal processing unit 140 generates G color signals having grayscales matching with the output signals of the B pixel 220 and the R pixel 240 through the correction.

The live view image 551 schematically illustrates the live view image which is generated by the signal processing unit 140 to be displayed on the display unit 170. In the live view image 551, a rectangular frame (focus area 552) indicating the area where the focus alignment determination unit 151 performs the focus alignment determination, a dog as a target object of the focus alignment determination, and a mountain as a background of the dog are illustrated.

In this manner, the output signal of the G pixel 230 is corrected in the phase difference detection operation, so that the generation of the live view image together with the focus alignment process through the phase difference detection is performed in the phase difference detection operation period.

In addition, with respect to the image generated together with the focus alignment process through the phase difference detection in the phase difference detection operation period, the embodiment of the present disclosure is not limited to usage as the live view image. But, for example, in the case of capturing a moving picture, usage as images constituting the moving picture or the like may be considered.

[Example of Still Image Generation]

Figure 18A:
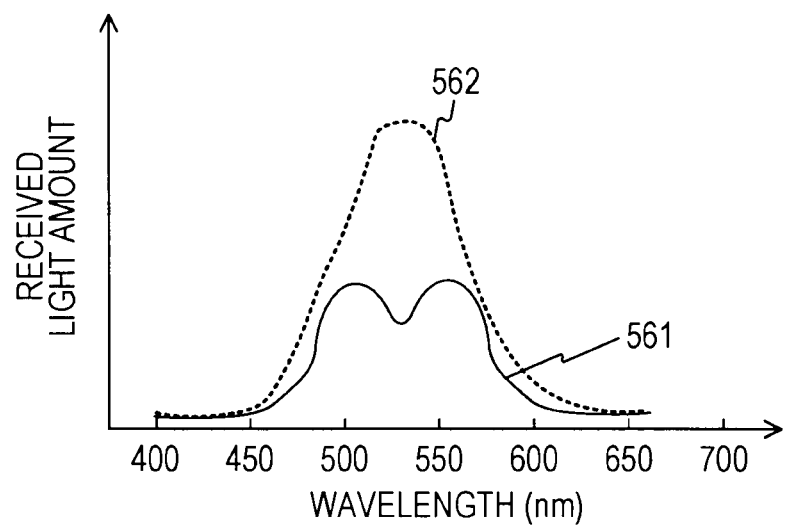
FIGS. 18A and 18B are diagrams illustrating an example of still image generation in the signal processing unit according to the first embodiment of the present disclosure.
Figure 18B:
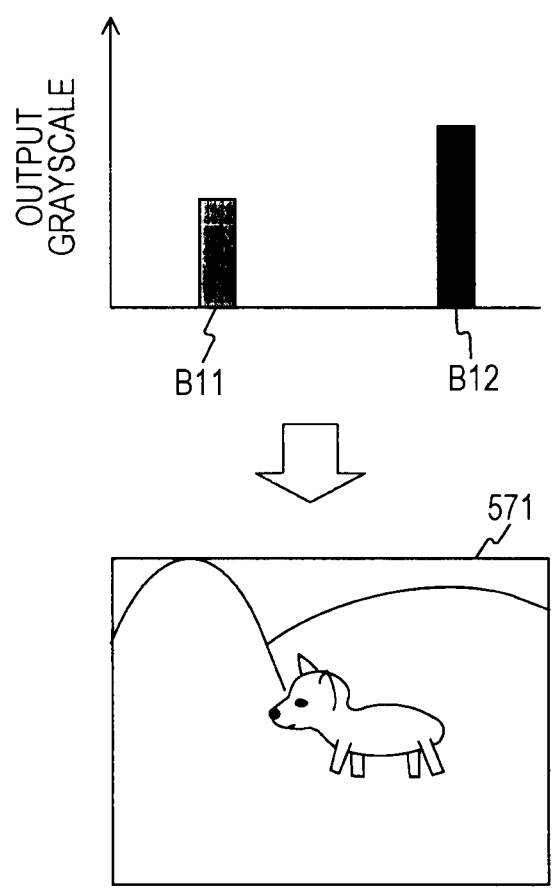

FIGS. 18A and 18B are diagrams illustrating an example of still image generation in the signal processing unit 140 according to the first embodiment of the present disclosure. In addition, in FIG. 18A, for convenience of the description, the subject light is assumed to have the same light amount in all the wavelengths. In addition, since the G pixel 231 is the same as the G pixel 230, only the G pixel 230 is described herein.

In FIG. 18A, the light received by the G pixel 230 in the still image capturing period and the light received by the G pixel 230 in the correction process are schematically illustrated in a graph where the horizontal axis is set to the axis indicating the wavelength of the light and the vertical axis is set to the axis indicating the amount of the light received by the G pixel 230. FIG. 18A illustrates a curve (received light amount 561 of the G pixel 230) indicating the amount of the light received by the G pixel 230 in each of the wavelength and a curve (corrected received light amount 562) indicating the amount of the light received by the G pixel 230 through the correction of the light amount indicated by the received light amount 561 of the G pixel 230.

The received light amount 561 of the G pixel 230 indicates an amount of the light which the G pixel 230 receives in the still image capturing operation period in each wavelength of the light. In FIG. 18A, since the light having the same light amount in all the wavelengths is the subject light, the received light amount 561 of the G pixel 230 illustrates the curve obtained by adding the spectral characteristics of the Gs filter 236 and the G1 filter 237 illustrated in FIGS. 5A and 5B.

The corrected received light amount 562 indicates an amount of the light which the G pixel 230 receives in the correction process of the signal processing unit 140 based on the received light amount 561 of the G pixel 230 in each wavelength of the light. In addition, since the corrected received light amount 562 is the same as the corrected received light amount 532 illustrated in FIG. 17A, the description thereof is omitted herein.

In other words, the signal processing unit 140 performs the correction, which calculates the light amount received by the G pixel including the G filter in the related art, based on the light amount received by the G pixel 230 in the still image capturing operation period.

FIG. 18B schematically illustrates the output signal of the G pixel 230, which is corrected in the correction process as illustrated in FIG. 18A, and the live view image displayed on the display unit 170. The bar graph illustrated in FIG. 18B illustrates the output signal (output signal B11 of the G pixel 230) of the G pixel 230 and the signal (corrected signal B12) after the correction process with respect to the output signal B11 of the G pixel 230, wherein the vertical axis is set to the axis indicating the grayscale of the output signal. In addition, the image illustrated in FIG. 18B schematically illustrates the still image (captured image 571) stored in the storage unit 160.

Since the configuration illustrated in FIG. 18B is substantially the same as that of FIG. 17B except that the captured image 571 is generated and stored in the storage unit 160, the description thereof is omitted herein. In addition, with respect to the correction of the output signal of the G pixel 230 in the still image capturing period, since the grayscale value of the to-be-corrected output signal (output signal B11 of the G pixel 230) is higher than the grayscale value in the live view image generation period, it is possible to perform correction at a high accuracy (to improve a quality of an image).

In this manner, by correcting the output signal of the G pixel 230 in the still image capturing operation, the still image (captured image 571) is generated in the still image capturing operation period.

[Example of Operations of Image Capturing Apparatus]

Next, operations of the image capturing apparatus 100 according to the first embodiment of the present disclosure are described with reference to the drawings.

FIG. 19 is a flowchart illustrating an example of an image capturing process procedure in the case where a still image is captured by the image capturing apparatus 100 according to the first embodiment of the present disclosure.

First, it is determined by the controller 130 whether or not a command of starting the image capturing operation for capturing the still image is made by a user (Step S901). Next, in the case where it is determined that the command of starting the image capturing operation for capturing the still image is not made by the user (Step S901), the image capturing process procedure is ended.

On the other hand, in the case where it is determined that the command of starting the image capturing operation for capturing the still image is made by the user (Step S901), in the operation switching filter insertion unit 300, the position of the operation switching filter 311 is reset (Step S902). In the case where the operation switching filter 311 is not inserted into the optical path of the subject light incident on the image sensor 200 due to the resetting, the operation switching filter 311 is inserted into the optical path.

Subsequently, in the image sensor 200, the phase difference detection and the image capturing process for generating the live view image are performed (Step S903). After that, in the focus alignment determination unit 151, the phase difference detection process is performed based on the output signals of the G pixel 230 and the G pixel 231, which are generated by the image capturing process (Step S904). Next, the position of the focus lens 113 is adjusted based on the result of the phase difference detection process by the driving unit 153 to perform the focus alignment process (Step S905). In addition, Step S904 is an example of a focus alignment determination procedure disclosed in the embodiments.

After that, the live view image is generated based on the output signals of all the pixels, which are generated in the image capturing process (Step S905), by the signal processing unit 140 (Step S906). Subsequently, the generated live view image is displayed by the display unit 170 (Step S907).

Next, it is determined by the controller 130 whether or not the shutter button is fully pressed in the manipulation receiving unit 120 (Step S908). Next, in the case where the shutter button is determined not to be fully pressed (Step S908), the procedure returns to Step S903.

On the other hand, in the case where the shutter button is determined to be fully pressed (Step S908), in the operation switching filter insertion unit 300, the operation switching filter 311 is detached from the optical path of the subject light (Step S909). Subsequently, the still image is captured by the image sensor 200 (Step S911). Next, the still image which is signal-processed by the signal processing unit 140 is recorded in the storage unit 160 (Step S912). After that, in the operation switching filter insertion unit 300, the operation switching filter 311 is inserted into the optical path of the subject light (Step S913). In addition, Step S903 and Step S911 are examples of a signal generation procedure disclosed in the embodiments. In addition, Step S902 and Step S913 are examples of a light blocking procedure disclosed in the embodiments. In addition, Step S906 and Step S912 are examples of an image generation procedure disclosed in the embodiments. In addition, Step S902, Step S909, and Step S913 are examples of a control procedure disclosed in the embodiments.

Next, it is determined by the controller 130 whether or not a command of ending the image capturing operation for capturing the still image is made by the user (Step S914). Next, in the case where it is determined that the command of ending the image capturing operation for capturing the still image is not made by the user (Step S914), the procedure returns to Step S903.

On the other hand, in the case where it is determined that the command of ending the image capturing operation for capturing the still image is made by the user (Step S914), the image capturing process procedure is ended.

In addition, any one of Steps S904 and S905 and Steps S906 and S907 may be performed before others.

In this manner, in the first embodiment of the present disclosure, the operation switching filter 311 and the image sensor 200, where the G pixel (G pixels 230 and 231) capable of generating the signal for the phase difference detection are disposed, may be included in the image capturing apparatus 100. The image capturing apparatus 100 controls the presence of the G1 light supplied to the image sensor 200 according to the presence of the operation switching filter 311 on the optical path of the subject light, so that it is possible to perform the phase difference detection without the pixel dedicated to the phase difference detection. In other words, in the image sensor 200, all the pixels are configured in the Bayer array. In addition, since there is no phase difference detection pixel, there is no pixel which is treated as a defective pixel. In other words, according to the first embodiment of the present disclosure, in the case where the image is generated by the image sensor used for the phase difference detection and the image generation, it is possible to improve a quality of the generated image.

2. Second Embodiment

In the first embodiment of the present disclosure, an example of the front surface illumination type image sensor 200 is described. The front surface illumination type image sensor 200 includes a wire line layer between the color filter and the light receiving device. Therefore, according to the thickness of the layer, the light incidence position of the microlens (for example, the spherical surface of the microlens 401 in FIGS. 10 to 15) is necessarily separated from the color filter. In addition, as the interval between the color filter and the light receiving device becomes shorter, the microlens may be closer to the color filter.

Therefore, in the second embodiment of the present disclosure, an example of the rear surface type image sensor where the wire line layer is disposed in the rear side of the light receiving device (the side opposite to the light incidence surface) is described with reference to FIG. 20.

[Example of Incident Light on G Pixel in Phase Difference Detection Operation]

Figure 20:
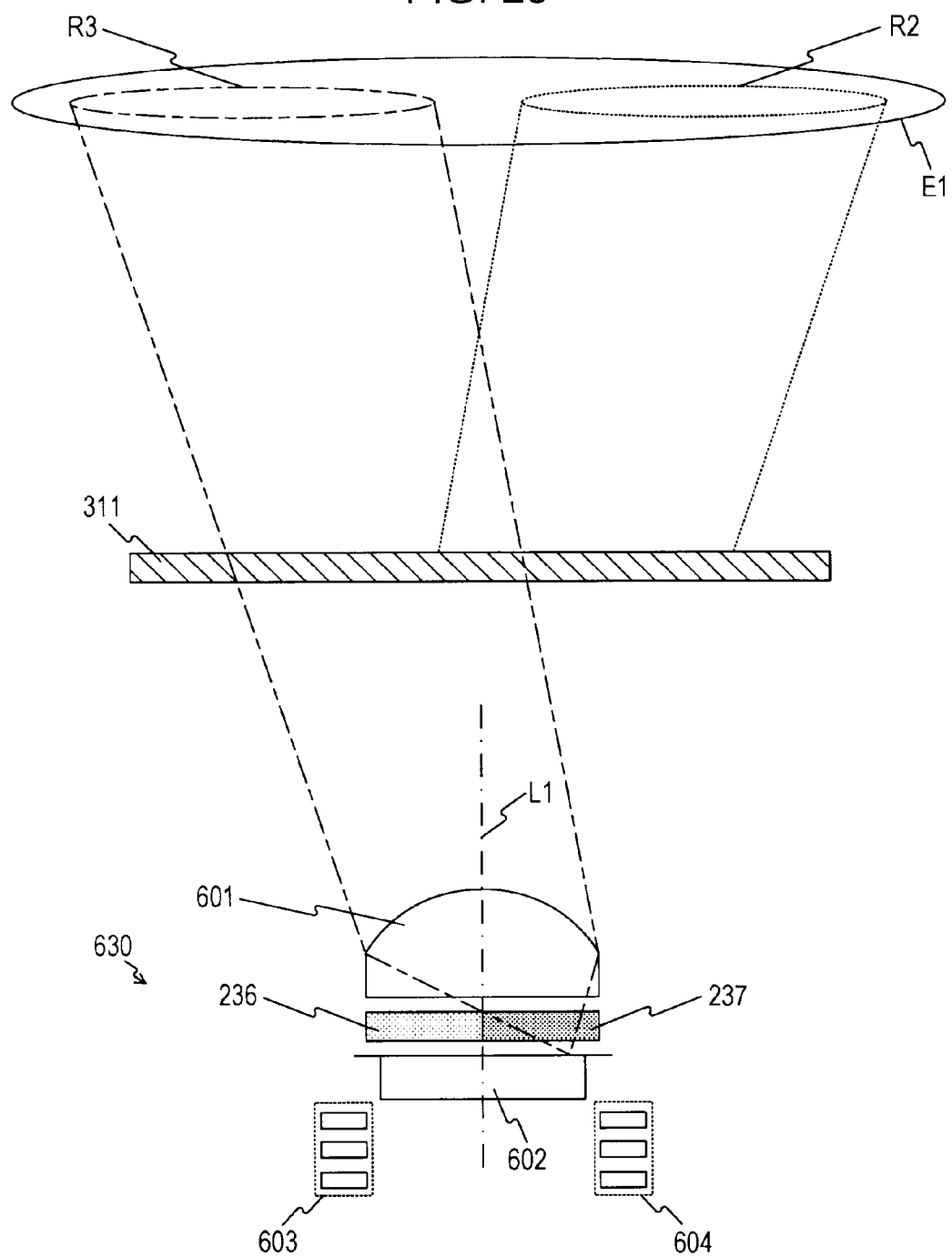
FIG. 20 is a schematic image diagram illustrating incident light on a G pixel (G pixel) of a rear surface type image sensor in a phase difference detection operation according to a second embodiment of the present disclosure, and FIG. 20 corresponds to FIG. 14.

FIG. 20 is a schematic image diagram illustrating incident light on a G pixel (G pixel 630) of the rear surface type image sensor in a phase difference detection operation according to the second embodiment of the present disclosure. FIG. 20 corresponds to FIG. 14.

FIG. 20 illustrates a cross-sectional diagram of the G pixel (G pixel 630) in the rear surface type image sensor and the microlens (microlens 601) of the G pixel 630, a cross-sectional diagram of the operation switching filter 311, and FIG. 20 also illustrates an emitting pupil E1, an area R3, and an area R2. In addition, since the components other than the G pixel 630 and the microlens 601 are the same as those illustrated in FIG. 14, the description is omitted herein.

The G pixel 630 includes wire lines (wire line 603 and wire line 604) for connection to circuits of the G pixel 630, a light receiving device 602, a Gs filter 236, and a G1 filter 237. Due to the rear surface type image sensor, the wire line 603 and the wire line 604 are disposed on the rear surface (the surface of the opposite side of the surface included in the microlens 601) of the light receiving device 602. In other words, the Gs filter 236 and the G1 filter 237 are disposed to be close to the light receiving device 602. In addition, since the Gs filter 236 and the G1 filter 237 are close to the light receiving device 602, the incidence surface (spherical surface) of the subject light of the microlens 601 may be disposed at a position according to the interval between the light receiving device 602 and the filter. In other words, in comparison with front surface type image sensor, the interval between the incidence surface of the microlens 601 and the light receiving device 602 may be shortened.

In this manner, according to the second embodiment of the present disclosure, although the pixels dedicated to the phase difference detection are not included in the rear surface type image sensor, it is possible to perform the phase difference detection by the image sensor. In addition, in comparison with the front surface type image sensor, the distance between the microlens 601 and the light receiving device 602 is shortened, so that it is possible to efficiently collect light toward the light receiving device 602.

3. Third Embodiment

In the first and second embodiments of the present disclosure, the examples of using the operation switching filter 311 which blocks the Gs light are described. Herein, with respect to the focus alignment target object, it is also assumed that the Gs light is the main subject light. However, in the first and second embodiments of the present disclosure, since the Gs light is blocked, with respect to the focus alignment target object, where the Gs light is the main subject light, it may be considered that the focus detection may not be performed.

Now, an example of using an operation switching filter which blocks a G1 light according to a third embodiment of the present disclosure is described with reference to FIG. 21.

[Example of Spectral Characteristics of Operation Switching Filter Blocking G1 Light]

FIG. 21 is a graph illustrating an example of spectral characteristics of the operation switching filter (operation switching filter 711) which blocks the G1 light according to the third embodiment of the present disclosure. FIG. 21 corresponds to FIG. 9.

The operation switching filter 711 is an optical filter which blocks only the light in the wavelength range (from about 525 nm to about 580 nm) where the transmittance of the G1 filter 237 is high. Instead of the operation switching filter 311 illustrated in the first embodiment of the present disclosure, the operation switching filter 711 is inserted into the optical path of the subject light in the image sensor, so that only the Gs light transmitting through the Gs filter 236 is received by the G pixels 230 and 231. Therefore, in the phase difference detection operation period, the focus alignment determination unit 151 may perform the focus detection based on the Gs light received by the G pixel 230 and the G pixel 231.

In this manner, according to the third embodiment of the present disclosure, even in the case where the Gs light is the main subject light, the focus detection may be appropriately performed by the image sensor which does not include the pixels dedicated to the phase difference detection.

4. Fourth Embodiment

In the first to third embodiments of the present disclosure, the examples of using the Gs filter 236 and the G1 filter 237 which transmit green light are described. However, even in the case where the phase difference detection is performed by using the light transmitting through the filters other than the Gs filter and the G1 filter, the first to third embodiments of the present disclosure may be adapted.

Therefore, in the fourth embodiment of the present disclosure, an example where the R pixels provided with two types of filters and the operation switching filters which block light of the wavelength transmitting through the one type of the two types of filters are included is described with reference to FIGS. 22A and 22B.

[Example of Spectral Characteristics of On-Chip Color Filter and Example of Spectral Characteristics of Operation Switching Filter]

Figure 22A:
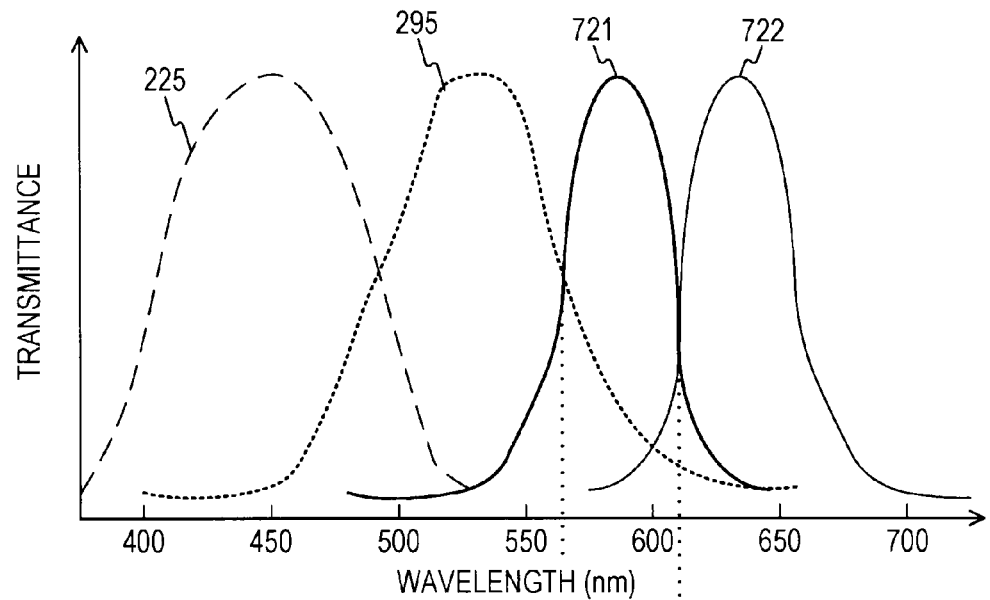
FIGS. 22A and 22B are graphs illustrating an example of spectral characteristics of on-chip color filters and an example of spectral characteristics of an operation switching filter according to a fourth embodiment of the present disclosure.
Figure 22B:
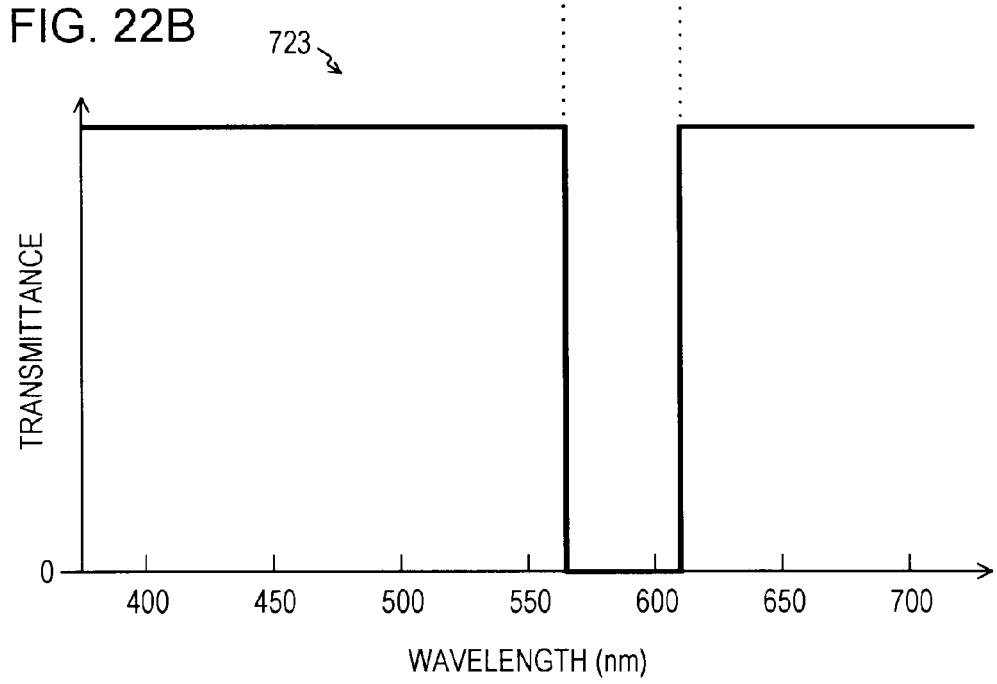

FIGS. 22A and 22B are graphs illustrating an example of spectral characteristics of on-chip color filters and an example of spectral characteristics of an operation switching filter according to the fourth embodiment of the present disclosure.

In FIG. 22A, the spectral characteristics of the on-chip color filters according to the fourth embodiment of the present disclosure are illustrated in the graph where the horizontal axis is set to the axis indicating the wavelength of light and the vertical axis is set to the axis indicating transmittances of the filters. In FIG. 22A, as the characteristics of the color filters, characteristics of a B (blue) filter 225, characteristics of a G (green) filter 295, characteristics of a Rs filter (Rs (short wavelength red) filter 721), and characteristics of a R1 filter (R1 (long wavelength red) filter 722) are illustrated. In addition, since the B (blue) filter 225 and the G (green) filter 295 are the same as those illustrated in FIG. 5A, the description is omitted herein.

The Rs filter (Rs (short wavelength red) filter 721) is a filter of which the transmittance with respect to the light in the wavelength range of from about 560 nm to about 610 nm is high. The Rs filter (Rs (short wavelength red) filter 721) has a high transmittance with respect to the light in the wavelength range, which is shorter than the wavelength (610 nm) substantially two-dividing the transmitted light, among the light (from 560 nm to 660 nm) which the R (red) filter 245 illustrated in FIGS. 5A and 5B mainly transmits.

The R1 filter (R1 (long wavelength red) filter 722) is a filter of which the transmittance with respect to the light in the wavelength range of from about 610 nm to about 660 nm is high. The R1 filter (R1 (long wavelength red) filter 722) has a high transmittance with respect to the light in the wavelength range, which is longer than the wavelength (610 nm) substantially two-dividing the transmitted light among the light which the R (red) filter 245 illustrated in FIGS. 5A and 5B mainly transmits.

In the fourth embodiment of the present disclosure, the two R pixels of the R pixel of which the left half portion is covered with the Rs filter 721 and of which the right half portion is covered with the R1 filter 722 and the R pixel of which the right half portion is covered with the Rs filter 721 and of which the left half portion is covered with the R1 filter 722 may be included in the image sensor.

In FIG. 22B, the spectral characteristics of the operation switching filter (operation switching filter 723) which blocks the Rs light according to the fourth embodiment of the present disclosure are illustrated.

The operation switching filter 723 is an optical filter which blocks only the light in the wavelength range (from about 560 nm to about 610 nm) where the transmittance of the Rs filter 721 is high. The operation switching filter 723 is inserted into the optical path of the subject light in the image sensor, so that only the R1 light transmitting through the R1 filter 722 is received by the R pixel. Therefore, in the phase difference detection operation period, the focus alignment determination unit may perform the focus detection based on the R1 light received by the R pixel.

In this manner, according to the fourth embodiment of the present disclosure, the focus detection may be performed based on the R1 light by the image sensor which does not include the pixels dedicated to the phase difference detection.

In addition, although the R pixel is described in FIGS. 22A and 22B, the B pixel may also be described similarly.

In this manner, according to the embodiments of the present disclosure, the phase difference detection may be performed by the image sensor including no pixels dedicated to the phase difference detection. Accordingly, in the case where an image is generated by using an image sensor which is used for phase difference detection and image generation, it is possible to improve the quality of the generated image.

In addition, in the first to fourth embodiments of the present disclosure, in the pixels which include two types of filters in two half portions thereof so as to perform the phase difference detection, the two types of filters are assumed to be aligned in the horizontal direction (x axis direction), but the configuration is exemplary one. Besides, the two types of filters may be aligned in the vertical direction (y axis direction) or in a slant direction. In addition, a combination of these configurations may also be considered.

In addition, in the first to fourth embodiments of the present disclosure, the on-chip color filter is assumed to be constructed with three types of filters, that is, red, green, and blue filters, but the embodiments of the present disclosure is not limited thereto. Even in the case where the on-chip color filter is constructed with filters having different spectral characteristics, the pixels covered with the filter transmitting light having a wavelength which is almost not overlapped with the wavelengths of the different color filters may be used, so that the same configurations as those of the first to fourth embodiments of the present disclosure may be implemented.

In addition, in the first to third embodiments of the present disclosure, although the example where all the green pixels in the image sensor 200 are the pixels (G pixels 230 and 231) covered with two filters is described, but the embodiments of the present disclosure is not limited thereto. For example, an example where the G pixel 290, the G pixel 230, and the G pixel 231, each of which is covered with one G filter, are disposed in a mixed manner may be considered.

In addition, the process procedure described in the embodiment of the present disclosure may be considered to be a method having a sequence of the processes, a program for allowing a computer to execute a sequence of the processes, or a recording medium storing the program. As the recording medium, for example, a CD (Compact Disc), an MD (Mini Disc), a DVD (Digital Versatile Disc), a memory card, a Blu-ray Disc (registered trade mark), and the like may be used.

The present disclosure contains subject matter related to that disclosed in Japanese Priority Patent Application JP 2010-174117 filed in the Japan Patent Office on Aug. 3, 2010, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image capturing apparatus comprising:
   an image capturing device where pixels covered with first filters which block light other than light in a first wavelength range among wavelength ranges obtained by two-dividing a specific wavelength range and second filters which block light other than light in a second wavelength range among the two-divided wavelength ranges are disposed based on a predetermined rule;
   a light blocking filter which is detachably disposed in an optical path of subject light toward the image capturing device and which blocks the light in the first wavelength range;
   a focus alignment determination unit which performs focus alignment determination through phase difference detection based on a signal generated by the image capturing device when the light blocking filter is inserted into the optical path;
   an image generation unit which generates an image based on a signal generated by the image capturing device; and
   a controller which performs control of insertion and detachment of the light blocking filter with respect to the optical path based on necessity or non-necessity of the focus alignment determination,
   wherein the image capturing device is configured so that pixels where one of a plurality of filters having different spectral sensitivities is disposed to each of the pixels and pixels covered with the first filters and the second filters, where a wavelength range of one filter of the plurality of filters is the specific wavelength range, are disposed based on the predetermined rule.

2. The image capturing apparatus according to claim 1,
   wherein the image capturing device is configured so that first pixels covered with the first filters and the second filters, which are disposed to be aligned in a specific direction, and second pixels covered with arrangement-switched first filters and second filters, which are obtained by switching the arrangement of the first filters and the second filters covering the first pixels, are disposed as the pixels, and
   wherein the focus alignment determination unit performs the focus alignment determination through the phase difference detection based on signals generated by the first pixels and signals generated by the second pixels.

3. The image capturing apparatus according to claim 2,
   wherein the first pixels and the second pixels are configured so that the first filters and the second filters are disposed to be aligned by using a straight line passing through centers of light receiving devices included in the pixels as a division line.

4. The image capturing apparatus according to claim 1, further comprising:
   a manipulation receiving unit which receives a recording command manipulation of instructing recording of a still image; and
   a recording controller which allows the image generated by the image generation unit to be recorded in a recording medium,
   wherein, when the recording command manipulation is received, the controller allows the light blocking filter inserted into the optical path to be detached from the optical path, and
   wherein, when the light blocking filter is detached from the optical path, the image generation unit generates the image based on the signal generated by the image capturing device.

5. The image capturing apparatus according to claim 1, further comprising a display controller which allows the image generated by the image generation unit to be displayed on a display unit,
   wherein, when the light blocking filter is inserted into the optical path, the image generation unit generates the image based on the signal generated by the image capturing device.

6. The image capturing apparatus according to claim 1, further comprising a recording controller which allows a moving picture including the image generated by the image generation unit to be recorded in a recording medium,
   wherein, when the light blocking filter is inserted into the optical path, the image generation unit generates the image based on the signal generated by the image capturing device.

7. The image capturing apparatus according to claim 1,
   wherein the image capturing device is configured so that red pixels covered with red filters which block light other than light in a wavelength range representing a red color, blue pixels covered with blue filters which block light other than light in a wavelength range representing a blue color, and pixels covered with the first filters and the second filters, where a wavelength range representing a green color is the specific wavelength range, are disposed, and
   wherein the image generation unit generates the image based on signals supplied by the red pixels, signals supplied by the blue pixels, and signals supplied by the pixels covered with the first filters and the second filters.

8. The image capturing apparatus according to claim 7, wherein the image capturing device is configured so that the red pixels, the blue pixels, and the pixels covered with the first filters and the second filters are disposed in a Bayer array.

9. The image capturing apparatus according to claim 1, wherein one of: a signal generated based on light transmitting through the first filter and light transmitting through the second filters or a signal generated based on the light transmitting through the second filters is supplied according to control of a light blocking filter which blocks light in the first wavelength range.

10. An image capturing method comprising:
generating a signal by using an image capturing device where pixels covered with first filters which block light other than light in a first wavelength range among wavelength ranges obtained by two-dividing a specific wavelength range and second filters which block light other than light in a second wavelength range among the two-divided wavelength ranges are disposed based on a predetermined rule;
blocking the light in the first wavelength range by using a light blocking filter which is detachably disposed in an optical path of subject light toward the image capturing device;
performing focus alignment determination through phase difference detection based on a signal generated by the image capturing device when the light blocking filter is inserted into the optical path;
generating an image based on the signal generated by the image capturing device; and
performing control of insertion and detachment of the light blocking filter with respect to the optical path based on necessity or non-necessity of the focus alignment determination,
wherein the image capturing device is configured so that pixels where one of a plurality of filters having different spectral sensitivities is disposed to each of the pixels and pixels covered with the first filters and the second filters, where a wavelength range of one filter of the plurality of the filters is the specific wavelength range, are disposed based on the predetermined rule.

11. A non-transitory computer-readable storage medium having stored thereon, a computer program having at least one code section to carry out image processing, said at least one code section being executable by a computer for causing said computer to perform steps comprising:
generating a signal by using an image capturing device where pixels covered with first filters which block light other than light in a first wavelength range among wavelength ranges obtained by two-dividing a specific wavelength range and second filters which block light other than light in a second wavelength range among the two-divided wavelength ranges are disposed based on a predetermined rule;
blocking the light in the first wavelength range by using a light blocking filter which is detachably disposed in an optical path of subject light toward the image capturing device;
performing focus alignment determination through phase difference detection based on a signal generated by the image capturing device when the light blocking filter is inserted into the optical path;
generating an image based on the signal generated by the image capturing device; and
performing control of insertion and detachment of the light blocking filter with respect to the optical path based on necessity or non-necessity of the focus alignment determination,
wherein the image capturing device is configured so that pixels where one of a plurality of filters having different spectral sensitivities is disposed to each of the pixels and pixels covered with the first filters and the second filters, where a wavelength range of one filter of the plurality of the filters is the specific wavelength range, are disposed based on the predetermined rule.

* * * * *